United States Patent
Hayashi et al.

(10) Patent No.: US 12,211,483 B2
(45) Date of Patent: Jan. 28, 2025

(54) ROBOT, AND SPEECH GENERATION PROGRAM

(71) Applicant: GROOVE X, INC., Tokyo (JP)

(72) Inventors: Kaname Hayashi, Tokyo (JP); John Belmonte, Tokyo (JP); Atsuya Kose, Tokyo (JP); Masaya Matsuura, Tokyo (JP); Hideya Minamiji, Tokyo (JP); Taiji Fukaya, Tokyo (JP); Takuma Miyamoto, Tokyo (JP)

(73) Assignee: GROOVE X, INC., Tokyo (JP)

( * ) Notice: Subject to any disclaimer, the term of this patent is extended or adjusted under 35 U.S.C. 154(b) by 440 days.

(21) Appl. No.: 17/185,997

(22) Filed: Feb. 26, 2021

(65) Prior Publication Data

US 2021/0183359 A1 Jun. 17, 2021

Related U.S. Application Data

(63) Continuation of application No. PCT/JP2019/034238, filed on Aug. 30, 2019.

(30) Foreign Application Priority Data

Aug. 30, 2018 (JP) .................. 2018-161616
Aug. 30, 2018 (JP) .................. 2018-161617

(51) Int. Cl.
*G10L 13/033* (2013.01)
*A63H 3/28* (2006.01)
(Continued)

(52) U.S. Cl.
CPC ............ *G10L 13/0335* (2013.01); *A63H 3/28* (2013.01); *G10L 13/04* (2013.01); *G10L 15/22* (2013.01);
(Continued)

(58) Field of Classification Search
USPC ................ 704/246, 247, 251, 252, 268, 275
See application file for complete search history.

(56) References Cited

U.S. PATENT DOCUMENTS 10,237,304 B1 * 3/2019 Sokolov .................. G06F 3/013
2002/0019678 A1 2/2002 Mizokawa
(Continued)

FOREIGN PATENT DOCUMENTS

CN 101653662 A 2/2010
CN 107277736 A 10/2017
(Continued)

OTHER PUBLICATIONS

Office Action in CN Application No. 201980055183.8, dated Dec. 31, 2021. 16pp.
(Continued)

*Primary Examiner* — Leonard Saint-Cyr
(74) *Attorney, Agent, or Firm* — Hauptman Ham, LLP

(57) ABSTRACT

The present application provides a robot that a user feels more strongly to be a living being. A robot includes a speech generating unit that generates speech and a speech output unit that outputs the generated speech. The robot outputs speech generated by the robot rather than outputting speech prepared in advance. Because of this, speech that is in accordance with sensor information can be generated and output, or speech unique to the robot can be generated and output.

21 Claims, 18 Drawing Sheets

(51) Int. Cl.
  *G10L 13/04* (2013.01)
  *G10L 15/22* (2006.01)
  *H04R 1/02* (2006.01)
  *H04R 1/08* (2006.01)
  *A63H 11/00* (2006.01)
  *G01P 15/00* (2006.01)
  *G05D 1/00* (2006.01)

(52) U.S. Cl.
  CPC ............. *H04R 1/028* (2013.01); *H04R 1/08* (2013.01); *A63H 11/00* (2013.01); *A63H 2200/00* (2013.01); *G01P 15/00* (2013.01); *G05D 1/0212* (2013.01); *G10L 2015/228* (2013.01)

(56) References Cited

U.S. PATENT DOCUMENTS

| | | | |
|---|---|---|---|
| 2003/0220796 A1* | 11/2003 | Aoyama | G10L 15/22 704/E15.04 |
| 2004/0019484 A1* | 1/2004 | Kobayashi | G10L 13/02 704/258 |
| 2004/0019485 A1 | 1/2004 | Kobayashi et al. | |
| 2005/0069173 A1 | 3/2005 | Morisada et al. | |
| 2005/0240412 A1* | 10/2005 | Fujita | G10L 15/16 704/E15.017 |
| 2010/0049368 A1 | 2/2010 | Chen | |
| 2014/0249676 A1 | 9/2014 | Florencio et al. | |
| 2017/0352351 A1* | 12/2017 | Kimura | B25J 13/089 |

FOREIGN PATENT DOCUMENTS

| | | | |
|---|---|---|---|
| JP | 2001179666 A | | 7/2001 |
| JP | 200249385 A | | 2/2002 |
| JP | 2002239959 A | | 8/2002 |
| JP | 2004258289 A | * | 9/2004 |
| JP | 20066586 A | | 1/2006 |
| JP | 4150198 B2 | | 9/2008 |
| JP | 201094799 A | | 4/2010 |
| JP | 2012217584 A | | 11/2012 |
| JP | 201519763 A | | 2/2015 |
| JP | 201523989 A | | 2/2015 |

OTHER PUBLICATIONS

Office Action in CN Application No. 201980055183.8, dated Aug. 3, 2022. 17pp.

International Search Report in PCT/JP2019/034238, mailed Nov. 12, 2019. 4pp.

Office Action in JP Application No. 2020-539648, mailed Sep. 26, 2023. 8pp.

* cited by examiner

FIG. 6

| INDEX | NUMBER OF SYLLABLES | INTONATION PATTERN |
|---|---|---|
| Ii1-1 | ONE SYLLABLE | LOW |
| Ii1-2 | | INTERMEDIATE |
| Ii1-3 | | HIGH |
| Ii2-1 | TWO SYLLABLES | LOW-LOW |
| Ii2-2 | | LOW-INTERMEDIATE |
| Ii2-3 | | LOW-HIGH |
| Ii2-4 | | INTERMEDIATE-LOW |
| Ii2-5 | | INTERMEDIATE-INTERMEDIATE |
| Ii2-6 | | INTERMEDIATE-HIGH |
| Ii2-7 | | HIGH-LOW |
| Ii2-8 | | HIGH-INTERMEDIATE |
| Ii2-9 | | HIGH-HIGH |
| Ii3-1 | THREE SYLLABLES | LOW-LOW-LOW |
| Ii3-2 | | LOW-LOW-INTERMEDIATE |
| Ii3-3 | | LOW-LOW-HIGH |
| Ii3-4 | | LOW-INTERMEDIATE-LOW |
| Ii3-5 | | LOW-INTERMEDIATE-INTERMEDIATE |
| Ii3-6 | | LOW-INTERMEDIATE-HIGH |
| Ii3-7 | | LOW-HIGH-LOW |
| Ii3-8 | | LOW-HIGH-INTERMEDIATE |
| Ii3-9 | | LOW-HIGH-HIGH |
| Ii3-10 | | INTERMEDIATE-LOW-LOW |
| ⋮ | | ⋮ |
| Ii3-27 | | HIGH-HIGH-HIGH |

FIG. 7

| INDEX | NUMBER OF SYLLABLES | STRESS PATTERN |
|---|---|---|
| Ia1-1 | ONE SYLLABLE | WEAK |
| Ia1-2 | | INTERMEDIATE |
| Ia1-3 | | STRONG |
| Ia2-1 | TWO SYLLABLES | WEAK-WEAK |
| Ia2-2 | | WEAK-INTERMEDIATE |
| Ia2-3 | | WEAK-STRONG |
| Ia2-4 | | INTERMEDIATE-WEAK |
| Ia2-5 | | INTERMEDIATE-INTERMEDIATE |
| Ia2-6 | | INTERMEDIATE-STRONG |
| Ia2-7 | | STRONG-WEAK |
| Ia2-8 | | STRONG-INTERMEDIATE |
| Ia2-9 | | STRONG-STRONG |
| Ia3-1 | THREE SYLLABLES | WEAK-WEAK-WEAK |
| Ia3-2 | | WEAK-WEAK-INTERMEDIATE |
| Ia3-3 | | WEAK-WEAK-STRONG |
| Ia3-4 | | WEAK-INTERMEDIATE-WEAK |
| Ia3-5 | | WEAK-INTERMEDIATE-INTERMEDIATE |
| Ia3-6 | | WEAK-INTERMEDIATE-STRONG |
| Ia3-7 | | WEAK-STRONG-WEAK |
| Ia3-8 | | WEAK-STRONG-INTERMEDIATE |
| Ia3-9 | | WEAK-STRONG-STRONG |
| Ia3-10 | | INTERMEDIATE-WEAK-WEAK |
| ⋮ | | ⋮ |
| Ia3-27 | | STRONG-STRONG-STRONG |

FIG. 8

| INDEX | NUMBER OF SYLLABLES | LENGTH PATTERN |
|---|---|---|
| Il1-1 | ONE SYLLABLE | SHORT |
| Il1-2 | | INTERMEDIATE |
| Il1-3 | | LONG |
| Il2-1 | TWO SYLLABLES | SHORT-SHORT |
| Il2-2 | | SHORT-INTERMEDIATE |
| Il2-3 | | SHORT-LONG |
| Il2-4 | | INTERMEDIATE-SHORT |
| Il2-5 | | INTERMEDIATE-INTERMEDIATE |
| Il2-6 | | INTERMEDIATE-LONG |
| Il2-7 | | LONG-SHORT |
| Il2-8 | | LONG-INTERMEDIATE |
| Il2-9 | | LONG-LONG |
| Il3-1 | THREE SYLLABLES | SHORT-SHORT-SHORT |
| Il3-2 | | SHORT-SHORT-INTERMEDIATE |
| Il3-3 | | SHORT-SHORT-LONG |
| Il3-4 | | SHORT-INTERMEDIATE-SHORT |
| Il3-5 | | SHORT-INTERMEDIATE-INTERMEDIATE |
| Il3-6 | | SHORT-INTERMEDIATE-LONG |
| Il3-7 | | SHORT-LONG-SHORT |
| Il3-8 | | SHORT-LONG-INTERMEDIATE |
| Il3-9 | | SHORT-LONG-LONG |
| Il3-10 | | INTERMEDIATE-SHORT-SHORT |
| ⋮ | | ⋮ |
| Il3-27 | | LONG-LONG-LONG |

FIG. 9

| INDEX | NUMBER OF SYLLABLES | VIBRATO PATTERN |
|---|---|---|
| Iv1-1 | ONE SYLLABLE | PRESENT |
| Iv1-2 | | ABSENT |
| Iv2-1 | TWO SYLLABLES | PRESENT-PRESENT |
| Iv2-2 | | PRESENT-ABSENT |
| Iv2-3 | | ABSENT-PRESENT |
| Iv2-4 | | ABSENT-ABSENT |
| Iv3-1 | THREE SYLLABLES | PRESENT-PRESENT-PRESENT |
| Iv3-2 | | PRESENT-PRESENT-ABSENT |
| Iv3-3 | | PRESENT-ABSENT-PRESENT |
| Iv3-4 | | PRESENT-ABSENT-ABSENT |
| Iv3-5 | | ABSENT-PRESENT-PRESENT |
| Iv3-6 | | ABSENT-PRESENT-ABSENT |
| Iv3-7 | | ABSENT-ABSENT-PRESENT |
| Iv3-8 | | ABSENT-ABSENT-ABSENT |

ROBOT, AND SPEECH GENERATION PROGRAM

CROSS-REFERENCE TO RELATED APPLICATIONS

The present application is a continuation of International Application No. PCT/JP2019/034238, filed Aug. 30, 2019, which claims the benefit of Patent Application No. 2018-161616, filed in Japan on Aug. 30, 2018, and Patent Application No. 2018-161617, filed in Japan on Aug. 30, 2018, the disclosures of which applications are incorporated by reference herein in their entirety.

BACKGROUND OF THE INVENTION

Field of the Invention

At least one embodiment relates to a robot that outputs speech, and to a speech generation program for generating speech output by a robot.

Description of the Background Art

A robot that outputs speech is already known (for example, refer to JP-A-2010-94799). This kind of robot includes a sensor, and when the robot receives an external stimulus, the sensor detects this, and outputs speech responding to the external stimulus. Alternatively, this kind of robot outputs speech in accordance with an information processing in an interior. Because of this, a feeling that the robot is a living being is obtained by a user.

However, when the robot reproduces stereotyped speech prepared in advance when outputting speech, a user, by coming into contact with this kind of robot over a long period, loses the feeling that the robot is a living being, and forming an attachment to the robot becomes difficult.

SUMMARY OF THE INVENTION

In consideration of the heretofore described background, at least one embodiment has an object of providing a robot that a user feels more strongly to be a living being.

At least one embodiment is a robot, and has a configuration including a speech generating unit that generates speech and a speech output unit that outputs the generated speech. Rather than outputting speech prepared in advance, the robot outputs speech generated by the robot.

BRIEF DESCRIPTION OF THE DRAWINGS

FIG. 6 is a table showing a relationship between an intonation pattern and an index;
FIG. 7 is a table showing a relationship between a stress pattern and an index;
FIG. 8 is a table showing a relationship between a length pattern and an index;
FIG. 9 is a table showing a relationship between a vibrato pattern and an index.

DETAILED DESCRIPTION OF THE INVENTION

Figure 1A:
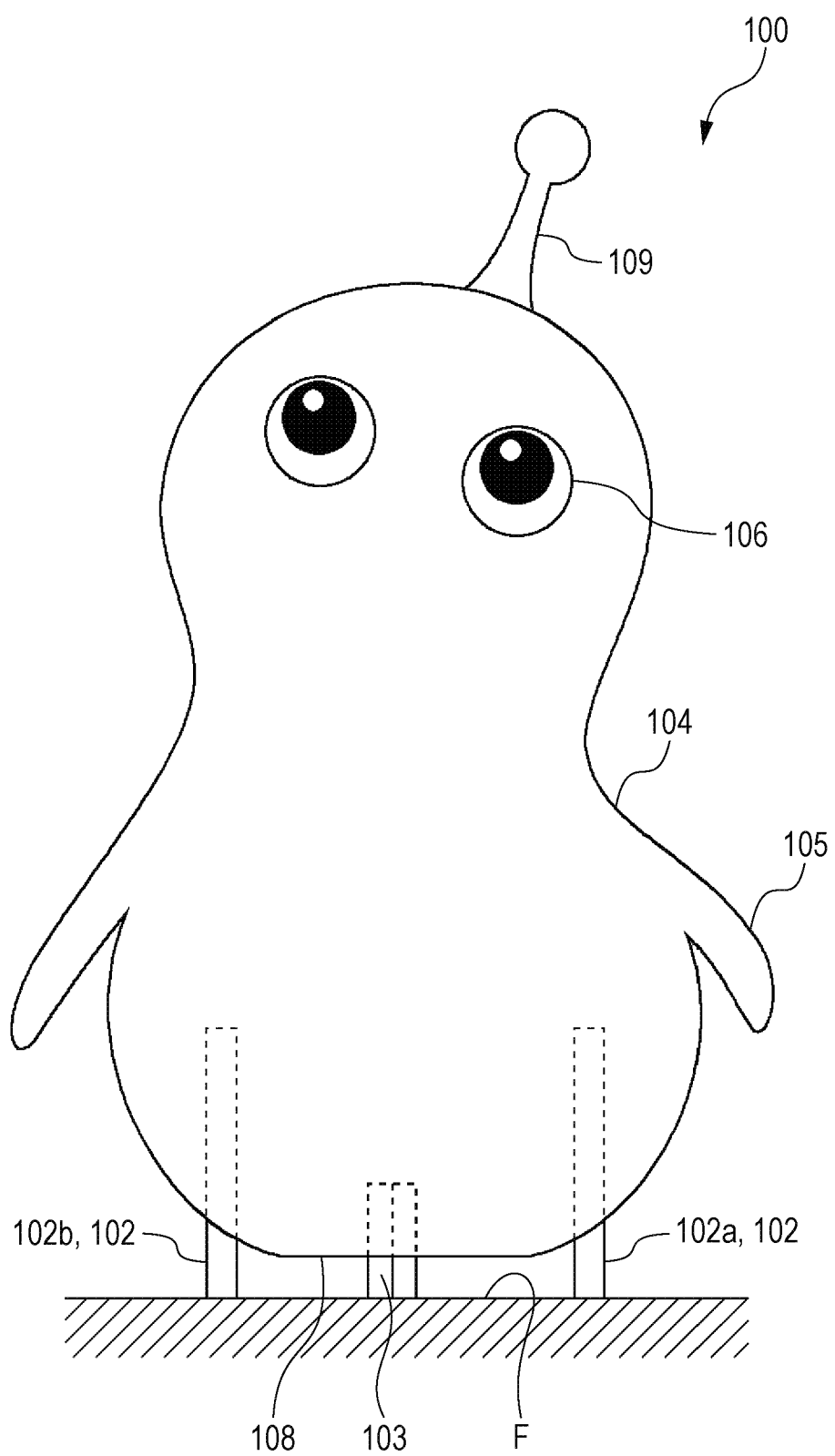
FIG. 1A is a front external view of a robot.

Hereafter, an embodiment will be described. The embodiment described hereafter shows one example, and does not limit the present invention to a specific configuration described hereafter. When implementing the invention, a specific configuration that is in accordance with the embodiment may be employed as appropriate.

A robot of the embodiment has a configuration including a speech generating unit that generates speech and a speech output unit that outputs the generated speech.

According to this configuration, the robot outputs speech generated by the robot rather than outputting speech prepared in advance. Because of this, the robot can generate and output speech that is in accordance with sensor information, or alternatively, the robot can generate and output speech that is unique to the robot, whereby a user can feel that the robot is like a living being. A timing at which speech is generated and a timing at which the speech is output may differ. That is, speech generated in the speech generating unit may be stored, and the stored speech output when a predetermined condition is fulfilled.

The robot of the embodiment may include a sensor that detects a physical quantity and outputs sensor information, and the speech generating unit may generate speech based on the sensor information.

According to this configuration, speech is generated based on sensor information, meaning that speech is not simply output by a stimulus from an exterior being detected as a physical quantity, but that speech that is in accordance with a property (for example, a size) of the stimulus can be generated.

The robot of the embodiment is such that the speech generating unit may generate speech when predetermined sensor information is input continuously for a predetermined time.

According to this configuration, flexible speech generation can be carried out in response to sensor information, rather than sensor information simply being reflected in speech generation as it is.

The robot of the embodiment may include a multiple of sensors that detect a physical quantity and output sensor information, and the speech generating unit may generate speech based on sensor information from the multiple of sensors.

According to this configuration, speech is generated based on multiple items of sensor information, rather than speech simply being generated based on one item of sensor information, because of which a more flexible speech generation can be carried out.

The robot of the embodiment may include a multiple of sensors that detect a physical quantity and output sensor information, and an interpreting unit that interprets a semantic situation in which the robot is placed based on the sensor information, and the speech generating unit may generate speech based on the semantic situation interpreted by the interpreting unit.

According to this configuration, sensor information is not simply reflected in speech generation, but rather a semantic situation is interpreted from the sensor information, and speech is generated based on the interpreted semantic situation, because of which speech indicating a response closer to that of a living being can be generated.

The robot of the embodiment is such that the speech generating unit may generate speech when it is interpreted using the interpreting unit that the robot is being hugged.

The robot of the embodiment is such that the speech generating unit may generate speech in which the sensor information is reflexively reflected.

According to this configuration, speech in which sensor information is reflexively reflected can be generated. For example, when a sensor is a sensor that detects a collision, and the speech output unit outputs speech in response to being subjected to the collision, the speech generating unit can output speech of a large magnitude when the collision is large, and can output speech of a small magnitude when the collision is small. Because of this, the speech generating unit can output speech of a magnitude that is in accordance with a stimulus, as does a living being. More specifically, in a case wherein the robot outputs speech saying "Ouch!" when the robot is hit, a robot that says "Ouch!" at a small magnitude when hit lightly, and says "Ouch!" at a large magnitude when hit hard, can be realized.

The robot of the embodiment is such that the speech generating unit may generate speech of a volume based on the sensor information.

According to this configuration, when a sensor is an acceleration sensor, for example, speech of a large magnitude can be generated when a large acceleration is detected.

The robot of the embodiment is such that the sensor may be an acceleration sensor that detects acceleration as the physical quantity and outputs acceleration as the sensor information, and the speech generating unit may generate speech whose volume changes in accordance with a change of the acceleration.

According to this configuration, for example, by causing the robot to vibrate, speech whose volume increases or decreases in accordance with a cycle of the vibration can be output.

The robot of the embodiment is such that the speech generating unit may generate speech of an interval based on the sensor information.

The robot of the embodiment is such that the sensor may be an acceleration sensor that detects acceleration as the physical quantity and outputs acceleration as the sensor information, and the speech generating unit may generate speech whose interval changes in accordance with a change of the acceleration.

According to this configuration, for example, by causing the robot to vibrate, speech having vibrato in accordance with a cycle of the vibration can be output.

A program of the embodiment is a program for generating speech output from the robot, and causes a computer to execute a speech generating step of generating speech and a speech outputting step of outputting the generated speech.

Also, the robot of the embodiment is a robot including a speech output unit that outputs individual speech. According to this configuration, individual speech is output from the robot, because of which a user is liable to feel that the robot is a living being. Because of this, the user forming an attachment to the robot is promoted.

In the embodiment, individual speech means, for example, speech that is distinguishable from that of another individual, and that has identity in the same individual. Vocal individuality means that, for example, even when a multiple of robots output speech with the same contents, spectral characteristics and rhythmic characteristics thereof differ in each individual. Also, vocal identity means that, for example, even when items of speech with differing contents are output by the same robot individual, the items of speech are recognized as being items of speech of the same individual.

The robot of the embodiment may further include an individuality forming unit that forms individuality, and the speech output unit may output speech that is in accordance with the formed individuality. According to this configuration, individuality is formed in a process of use rather than being provided fixedly.

The robot of the embodiment may further include a speech generating unit that generates speech that is in accordance with the formed individuality, and the speech output unit may output the generated speech. According to this configuration, speech is generated using a speech generating unit, because of which speech that is in accordance with individuality can be easily output.

The robot of the embodiment is such that the speech generating unit may include a standard speech fixing unit that fixes standard speech, and a speech adjusting unit that adjusts the fixed standard speech in such a way as to be individual speech. According to this configuration, individual speech can be easily generated.

The robot of the embodiment may further include a growth managing unit that manages growth of the robot, and the individuality forming unit may form the individuality in accordance with the growth of the robot. According to this configuration, individuality is formed in accordance with growth of the robot.

The robot of the embodiment may further include an instruction receiving unit that receives an instruction from a user, and the individuality forming unit may form the individuality based on the received instruction. According to this configuration, robot individuality can be formed based on a user instruction.

The robot of the embodiment may further include a microphone that converts a sound into an electrical signal, and the individuality forming unit may form the individuality based on the electrical signal. According to this configuration, individuality is formed based on received sound waves.

The robot of the embodiment may include a positioning device that measures a position, and the individuality forming unit may form the individuality based on a measured position. According to this configuration, individuality is formed in accordance with a position of the robot.

The robot of the embodiment is such that the individuality forming unit may fix the individuality at random.

Also, a robot of another aspect of the embodiment includes a speech generating unit that generates speech by simulating a speech emitting mechanism of a predetermined vocal organ, and a speech output unit that outputs generated speech. According to this configuration, individual speech can be generated and output by simulating a speech emitting mechanism of the vocal organ.

The robot of the embodiment may further include a sensor that acquires external environmental information, and the speech generating unit may cause a parameter used in a simulation to change based on environmental information obtained from the sensor.

The robot of the embodiment is such that the speech generating unit may cause the parameter to change in conjunction with environmental information obtained from the sensor.

The robot of the embodiment may further include an internal state managing unit that causes an internal state to change based on environmental information obtained from the sensor, and the speech generating unit may cause the parameter to change in conjunction with the internal state.

The robot of the embodiment is such that the vocal organ may have a vocal cord organ resembling a vocal cord, and may cause a parameter relating to the vocal cord organ to change in conjunction with a change of the internal state.

The robot of the embodiment is such that the vocal organ may have a multiple of organs, and the speech generating unit may use parameters indicating a form-related aspect of each organ accompanying a passing of time in a simulation.

The robot of the embodiment may further include a microphone that imports speech output from another robot, and a comparison unit that compares speech output from the other robot and the robot of the embodiment's speech, and the speech generating unit may cause parameters indicating the form-related aspects to change in such a way that the speech of the other robot and the robot of the embodiment's speech differ.

The robot of the embodiment further includes a speech generating condition recognizing unit that recognizes speech conditions including a speech output start timing and at least one portion of speech parameters, the speech generating unit may generate speech that coincides with a set of the at least one portion of speech parameters included in the speech conditions, and the speech output unit may output speech generated by the speech generating unit at the speech output start timing included in the speech conditions.

The robot of the embodiment is such that the speech generating unit may generate speech that coincides with the at least one portion of speech parameters included in the speech conditions, and that is in accordance with individuality of the robot.

The robot of the embodiment is such that the speech generating condition recognizing unit may recognize a first speech condition, which is a speech condition of the robot of the embodiment, via communication, and the first speech condition may be a condition the same as at least one portion of a second speech condition, which is a speech condition indicated to another robot.

The robot of the embodiment is such that the one portion of speech parameters may include a parameter indicating a pitch.

The robot of the embodiment is such that a first pitch included in the first speech condition may be in a predetermined relationship with a second pitch included in the second speech condition.

The robot of the embodiment is such that a first output start timing included in the first speech condition may be a timing the same as a second output start timing included in the second speech condition, and an interval that is a relative relationship between the first pitch included in the first speech condition and the second pitch included in the second speech condition may be a consonant interval.

The robot of the embodiment is such that the speech condition may include a condition indicating a length of speech contents, and the robot may further include a standard speech fixing unit that randomly fixes contents of speech corresponding to the length of speech contents.

The robot of the embodiment is such that the speech condition may include a condition indicating a length of speech contents, and the robot may further include a standard speech fixing unit that randomly fixes contents of speech corresponding to the length of speech contents based on items of speech collected in the past.

A program of the embodiment is a program for generating speech output from the robot, and causes a computer to execute an individuality forming step of forming individuality of the robot, a speech generating step of generating speech that is in accordance with the formed individuality, and a speech outputting step of outputting the generated speech.

Figure 1B:
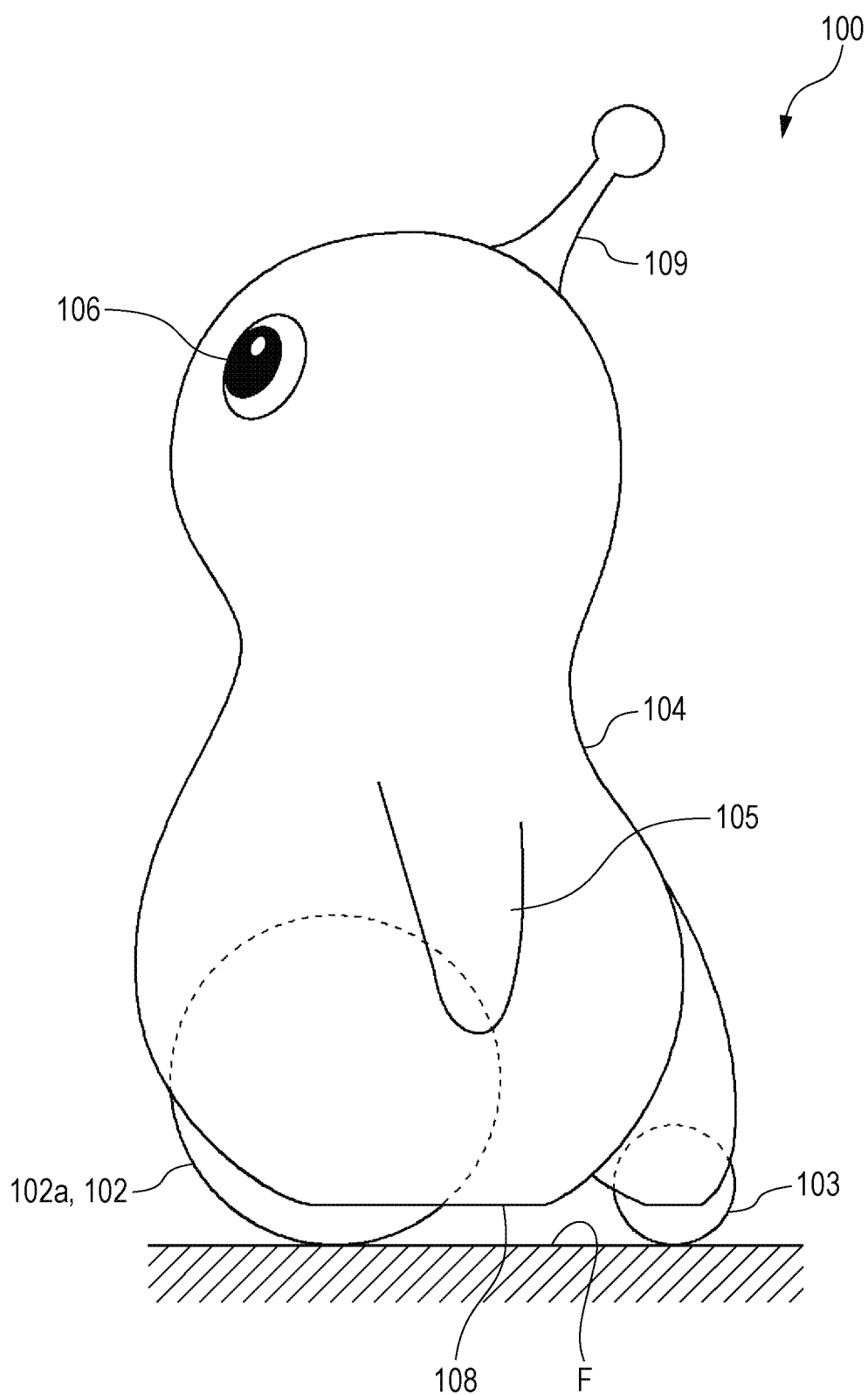
FIG. 1B is a side external view of a robot.

FIG. 1A is a front external view of a robot, and FIG. 1B is a side external view of the robot. A robot 100 in the embodiment is an autonomously acting robot that fixes an action or a gesture based on an external environment and an internal state. The external environment is detected by a sensor group including a camera, a microphone, an acceleration sensor, a touch sensor, and the like. The internal state is quantified as various parameters that express emotions of the robot 100.

The robot 100 has, for example, a familiarity parameter for each user as a parameter expressing emotion. When the robot 100 recognizes an action indicating a liking toward the robot 100, such as picking the robot 100 up or speaking to the robot 100, familiarity with respect to that user increases. Meanwhile, familiarity decreases with respect to a user not involved with the robot 100, a user who behaves roughly, or a user met infrequently.

A body 104 of the robot 100 has a rounded form all over, and includes an outer skin formed of a soft material having elasticity, such as urethane, rubber, a resin, or a fiber. A weight of the robot 100 is 15 kilograms or less, preferably 10 kilograms or less, and more preferably still 5 kilograms. Also, a height of the robot 100 is 1.2 meters or less, or preferably 0.7 meters or less. In particular, owing to size and weight being reduced by the weight being in the region of 5 kilograms or less and the height being in the region of 0.7 meters or less, a user, including a child, can easily hug the robot, which is desirable.

The robot 100 includes three wheels for three-wheeled traveling. The robot 100 includes a pair of front wheels 102 (a left wheel 102a and a right wheel 102b) and one rear wheel 103, as shown in the drawings. The front wheels 102 are drive wheels, and the rear wheel 103 is a driven wheel. Although the front wheels 102 have no steering mechanism, rotational speed and a direction of rotation can be individually controlled.

The rear wheel 103 is a so-called omni wheel or a caster, and rotates freely in order to cause the robot 100 to move forward and back, and left and right. By controlling so that the rotational speed of the right wheel 102b is greater than that of the left wheel 102a, the robot 100 can turn left or rotate counterclockwise. Also, by controlling so that the rotational speed of the left wheel 102a is greater than that of the right wheel 102b, the robot 100 can turn right or rotate clockwise.

The front wheels 102 and the rear wheel 103 can be completely housed in the body 104 using a drive mechanism (a pivoting mechanism and a linking mechanism). A greater portion of each wheel is hidden by the body 104 when traveling too, but when each wheel is completely housed in the body 104, the robot 100 is in a state of being unable to move. That is, the body 104 descends, and sits on a floor surface F, in accompaniment to an operation of the wheels being housed. In the sitting state, a flat seating face 108 (a grounding bottom face) formed in a bottom portion of the body 104 comes into contact with the floor surface F.

The robot 100 has two arms 105. The robot 100 is capable of actions such as raising, waving, and oscillating the arm 105. The two arms 105 can be individually controlled.

An image can be displayed in an eye 106 using a liquid crystal element or an organic EL element. The robot 100 includes various sensors, such as a microphone or an ultrasonic wave sensor that can identify a sound source direction, a smell sensor, a distance sensor, and an acceleration sensor. Also, the robot 100 incorporates a speaker, and can emit simple speech of in the region of one to three syllables. A capacitive touch sensor is installed in the body 104 of the robot 100. The robot 100 can detect a touch by a user using the touch sensor.

A horn 109 is attached to a head portion of the robot 100. An omnidirectional camera is attached to the horn 109, and can film all regions above the robot 100 at one time.

Figure 2:
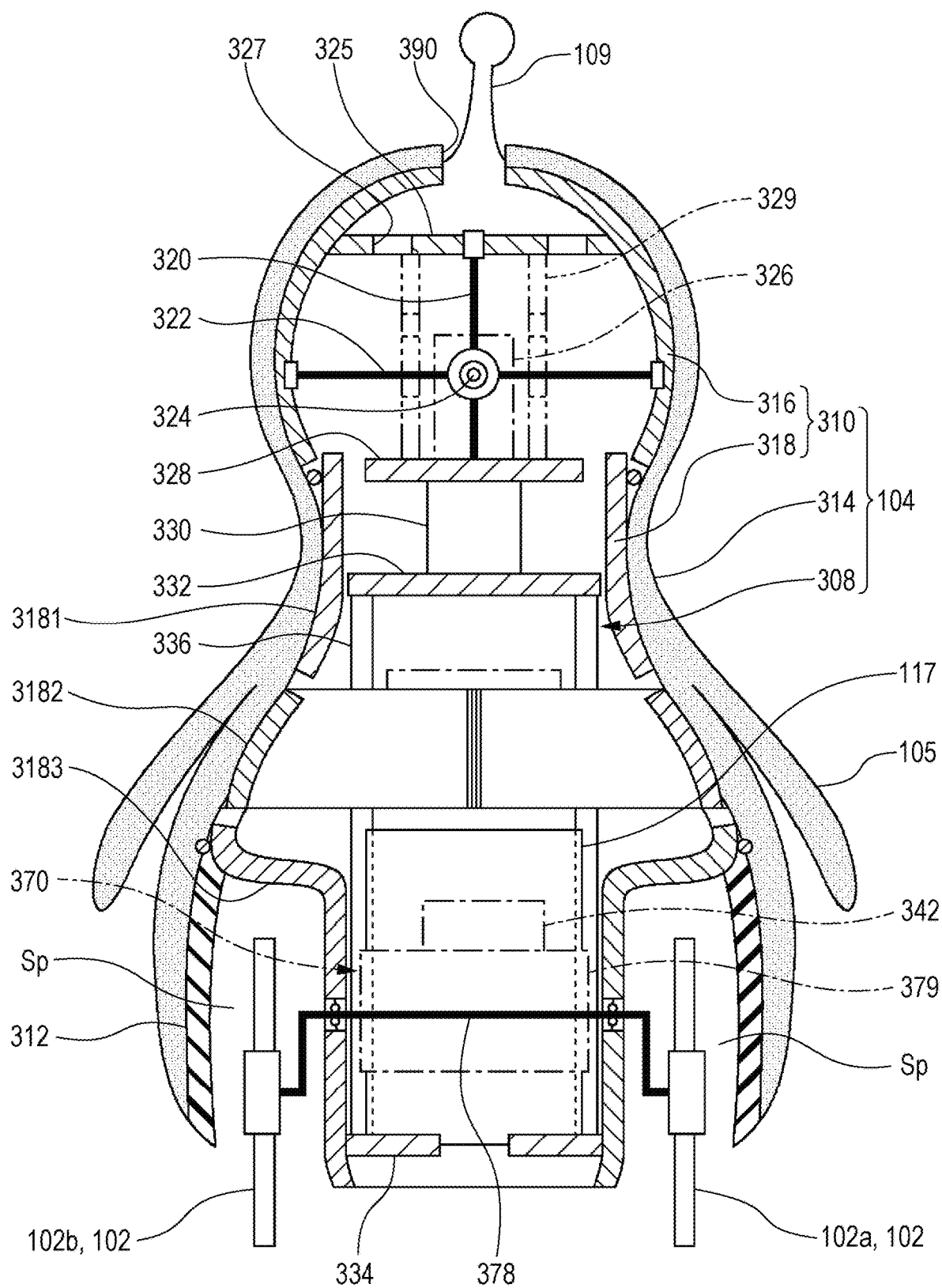
FIG. 2 is a sectional view schematically showing a structure of the robot.

FIG. 2 is a sectional view schematically showing a structure of the robot 100. As shown in FIG. 2, the body 104 of the robot 100 includes a base frame 308, a main body frame 310, a pair of resin wheel covers 312, and an outer skin 314. The base frame 308 is made of metal, configures an axial center of the body 104, and supports an internal structure. The base frame 308 is such that an upper plate 332 and a lower plate 334 are configured by a multiple of side plates 336 being linked thereto vertically. A sufficient interval is provided between the multiple of side plates 336 in order that ventilation can be carried out. A battery 117, a control circuit 342, and various kinds of actuator are housed inside the base frame 308.

The main body frame 310 is formed from a resin material, and includes a head portion frame 316 and a trunk portion frame 318. The head portion frame 316 is of a hollow hemispherical form, and forms a head portion framework of the robot 100. The trunk portion frame 318 is formed of a neck portion frame 3181, a chest portion frame 3182, and an abdominal portion frame 3183, is of a stepped cylindrical form overall, and forms a trunk portion framework of the robot 100. The trunk portion frame 318 is fixed integrally to the base frame 308. The head portion frame 316 is attached to an upper end portion (the neck portion frame 3181) of the trunk portion frame 318 in such a way as to be relatively displaceable.

Three shafts, those being a yaw shaft 320, a pitch shaft 322, and a roll shaft 324, and an actuator 326 for driving each shaft so as to rotate, are provided in the head portion frame 316. The actuator 326 includes a multiple of servo motors for driving each shaft individually. The yaw shaft 320 is driven for a head shaking action, the pitch shaft 322 is driven for a nodding action, and the roll shaft 324 is driven for a head tilting action.

A plate 325 that supports the yaw shaft 320 is fixed to an upper portion of the head portion frame 316. A multiple of ventilation holes 327 for securing ventilation between portions above and below are formed in the plate 325.

A metal base plate 328 is provided in such a way as to support the head portion frame 316 and an internal mechanism thereof from below. The base plate 328 is linked to the plate 325 via a cross-link 329 (a pantograph mechanism), and is coupled to the upper plate 332 (the base frame 308) via a joint 330.

The trunk portion frame 318 houses the base frame 308 and a wheel drive mechanism 370. The wheel drive mechanism 370 includes a rotary shaft 378 and an actuator 379. A lower half portion (the abdominal portion frame 3813) of the trunk portion frame 318 is of a small width in order to form a housing space Sp of the front wheel 102 between the trunk portion frame 318 and the wheel cover 312.

The outer skin 314 is formed of urethane rubber, and covers the main body frame 310 and the wheel covers 312 from an outer side. The arm 105 is molded integrally with the outer skin 314. An aperture portion 390 for introducing external air is provided in an upper end portion of the outer skin 314.

Figure 3A:
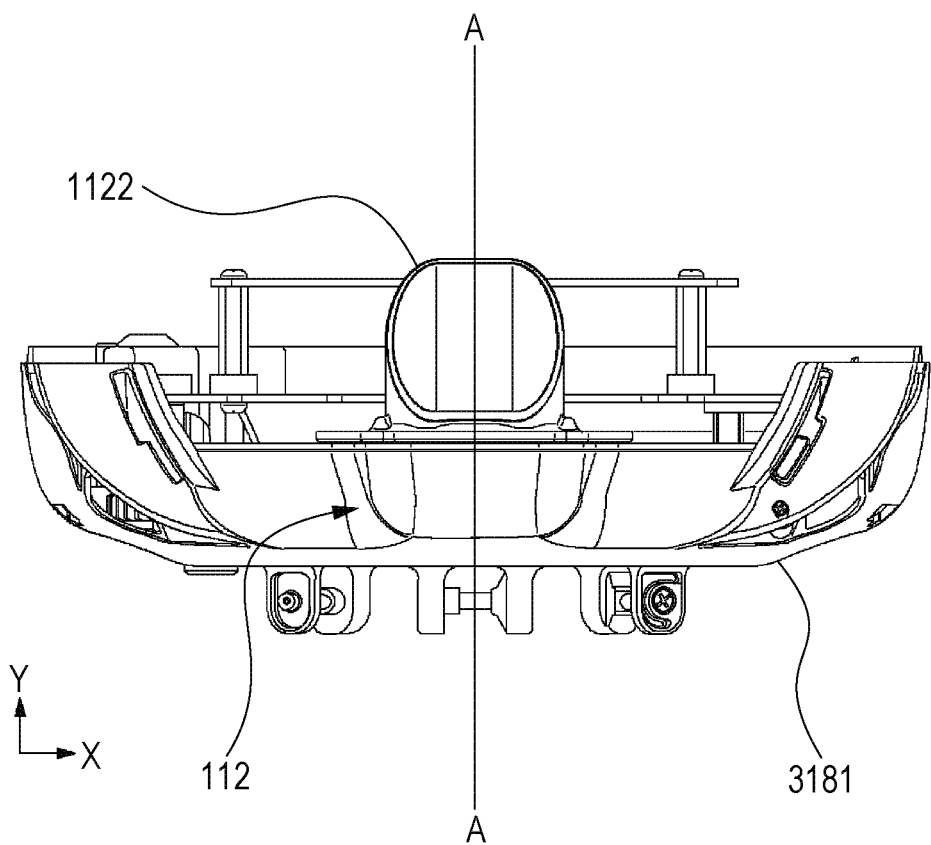
FIG. 3A is a front view of a neck portion of the robot.
Figure 3B:
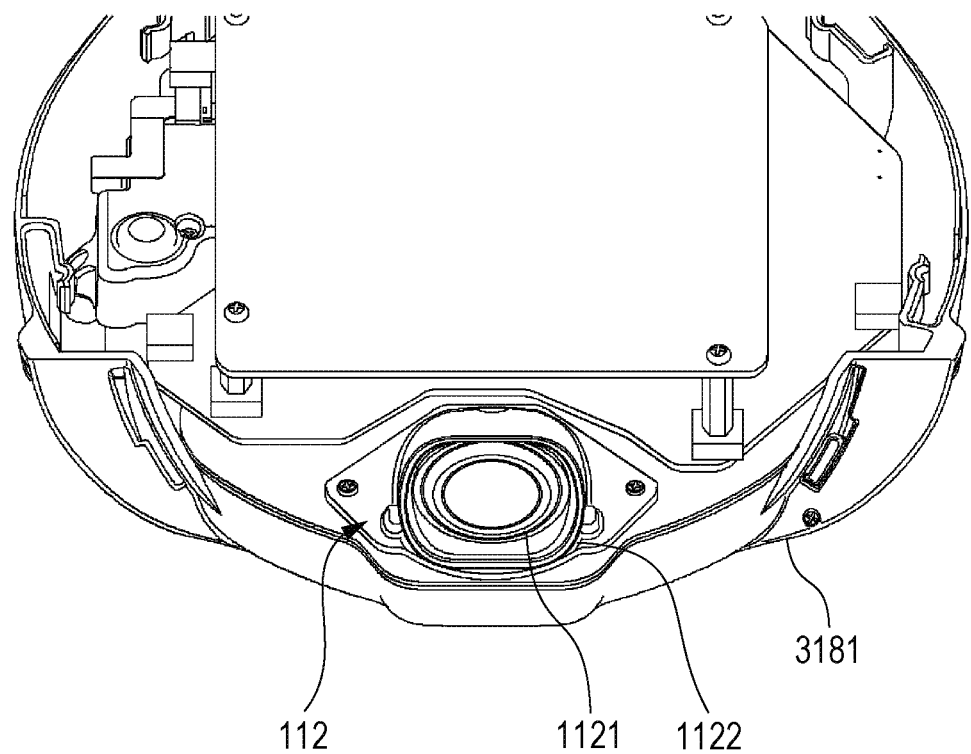
FIG. 3B is a perspective view of the neck portion of the robot seen from the front and above.
Figure 3C:
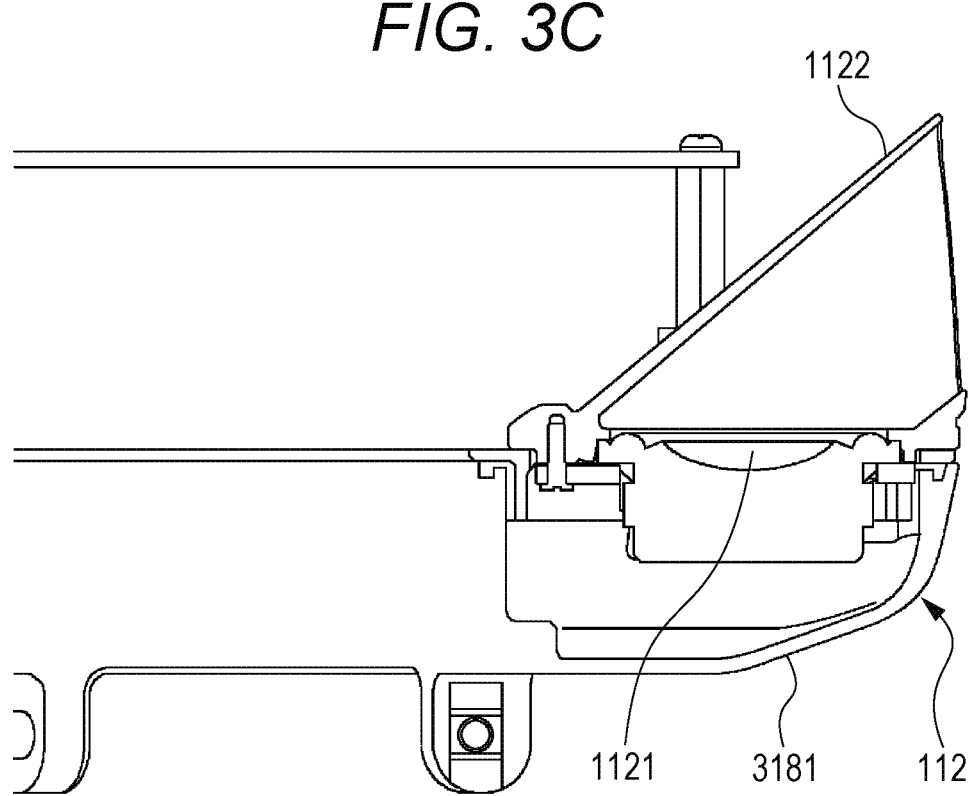
FIG. 3C is an A-A sectional view of the neck portion of the robot.
Figure 3D:
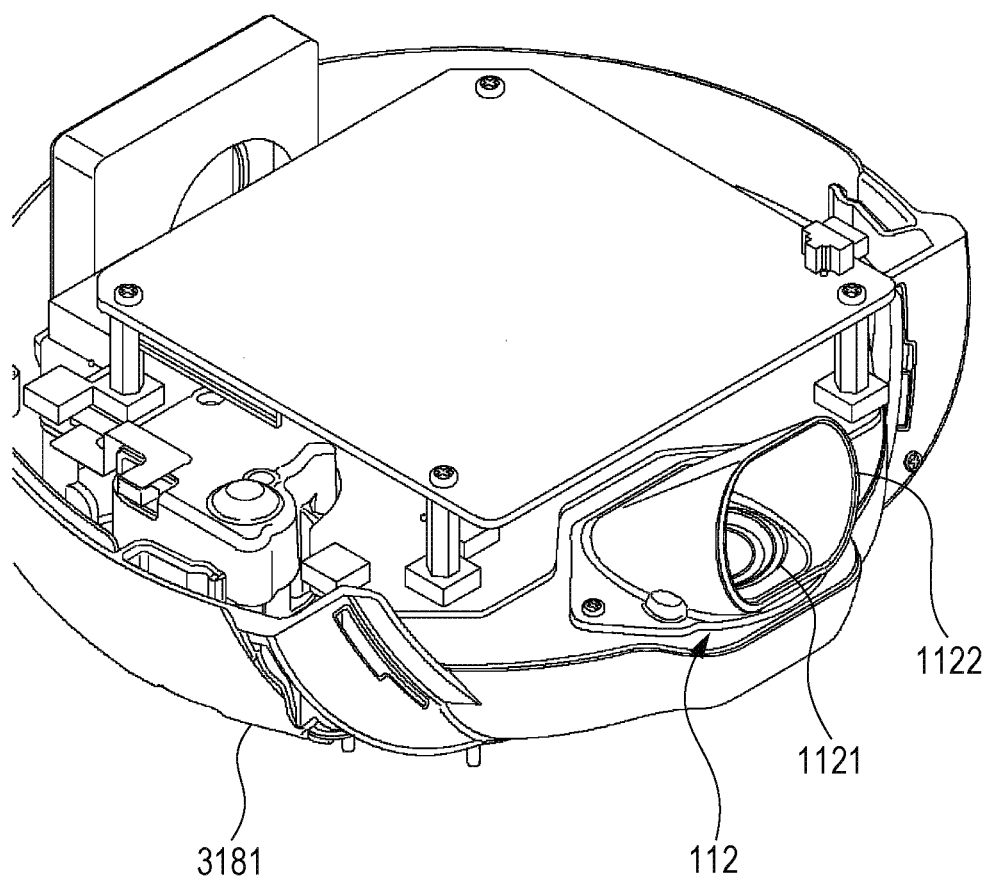
FIG. 3D is a perspective view of the neck portion seen from diagonally above.

FIG. 3A is a front view of a neck portion of the robot 100. FIG. 3B is a perspective view of the neck portion seen from the front and above. FIG. 3C is an A-A sectional view of the neck portion. FIG. 3D is a perspective view of the neck portion seen from diagonally above. The neck portion of the robot 100 is formed by various kinds of part, including a substrate, being mounted in the neck portion frame 3181. A speaker 112 is provided in the neck portion frame 3181.

The speaker 112 is installed facing upward on a front side of the neck portion frame 3181. That is, a diaphragm 1121 of the speaker 112 is installed in a horizontal direction. A horn 1122 is formed extending in upward and forward directions in an upper portion of the diaphragm 1121, and a leading end of the horn 1122 is opened toward the front. An opened face of the horn 1122 corresponds to a position of a mouth of the robot 100. Also, an area of the opened face of the horn 1122 and an area of the diaphragm 1121 are formed in such a way as to be approximately equal. By providing the horn 1122, a disposition of the speaker 112 can be provided with freedom.

According to this configuration, a sound wave generated by vibration of the diaphragm 1121 and emitted upward is output by the horn 1122 with an orientation changed to the front. Therefore, it sounds to a user as though speech is coming out of a mouth portion of the robot 100. In particular, the user can more clearly recognize that speech is being output from the mouth portion when speech of a low volume is emitted from the robot 100. Communication such that the user brings his or her ear closer to the mouth portion of the robot 100 in order to hear the speech clearly is conceivable.

Figure 4:
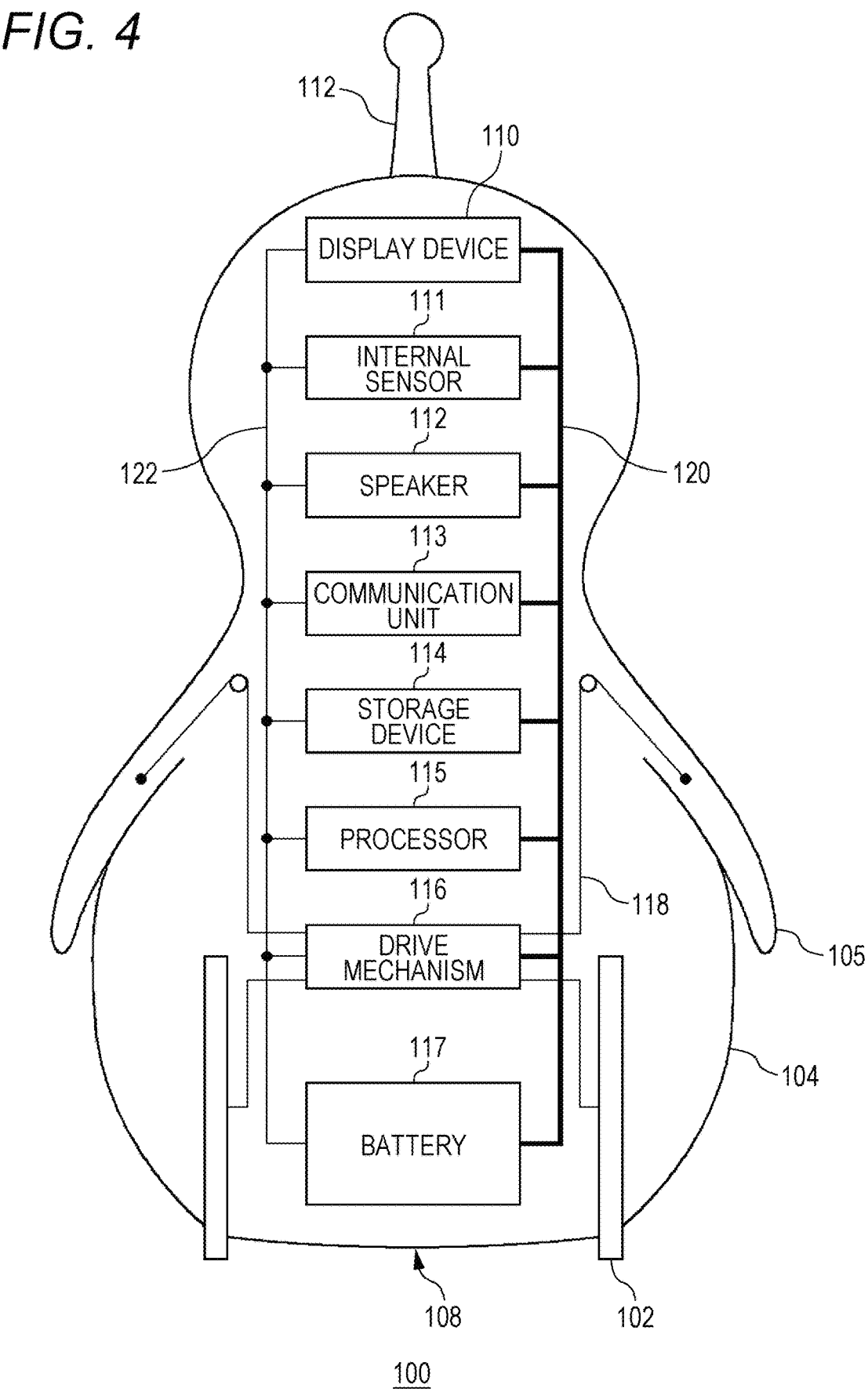
FIG. 4 is a drawing showing a hardware configuration of the robot.

FIG. 4 is a drawing showing a hardware configuration of the robot 100. The robot 100 includes a display device 110, an internal sensor 111, the speaker 112, a communication unit 113, a storage device 114, a processor 115, a drive mechanism 116, and a battery 117 inside a frame 101. The drive mechanism 116 includes the heretofore described wheel drive mechanism 370. The processor 115 and the storage device 114 are included in the control circuit 342.

The units are connected to each other by a power line 120 and a signal line 122. The battery 117 supplies power to each unit via the power line 120. Each unit transmits and receives a control signal via the signal line 122. The battery 117 is, for example, a lithium ion rechargeable battery, and is a power source of the robot 100.

The drive mechanism. 116 is an actuator that controls the internal mechanism. The drive mechanism 116 has a function of causing the robot 100 to move and of changing an orientation by driving the front wheels 102 and the rear wheel 103. The drive mechanism 116 controls the arm 105 via a wire 118, thereby causing actions such as raising the arm 105, waving the arm 105, and causing the arm 105 to oscillate to be carried out. Also, the drive mechanism 116 has a function of controlling the head portion, thereby changing an orientation of the head portion.

The internal sensor 111 is a collection of various kinds of sensor incorporated in the robot 100. As the internal sensor 111, there is, for example, a camera (omnidirectional camera), a microphone, a distance sensor (infrared sensor), a thermosensor, a touch sensor, an acceleration sensor, a smell sensor, and the like. The speaker 112 outputs speech.

The communication unit 113 is a communication module that carries out wireless communication with a server, an external sensor, another robot, and various kinds of external device, such as a mobile device possessed by a user, as a target. The storage device 114 is configured of a non-volatile memory and a volatile memory, and stores various kinds of program, including a speech generation program to be described hereafter, and various kinds of setting information. The drive mechanism 116 is an actuator that controls the internal mechanism.

The display device 110 is installed in a position of an eye of the robot, and has a function of causing an image of an eye to be displayed. The display device 110 displays an image of an eye of the robot 100 by combining eye parts such as a pupil and an eyelid. When external light or the like enters the eye, a catch light may be displayed in a position that is in accordance with a position of an external light source.

The processor 115 has a function of causing the robot 100 to act by controlling the drive mechanism 116, the speaker 112, the display device 110, and the like, based on sensor information acquired by the internal sensor 111 and various kinds of information acquired via the communication unit 113. Also, the robot 100 has a clock (unshown) that manages a current date and time. Information regarding the current date and time is provided to each unit as necessary.

Figure 5:
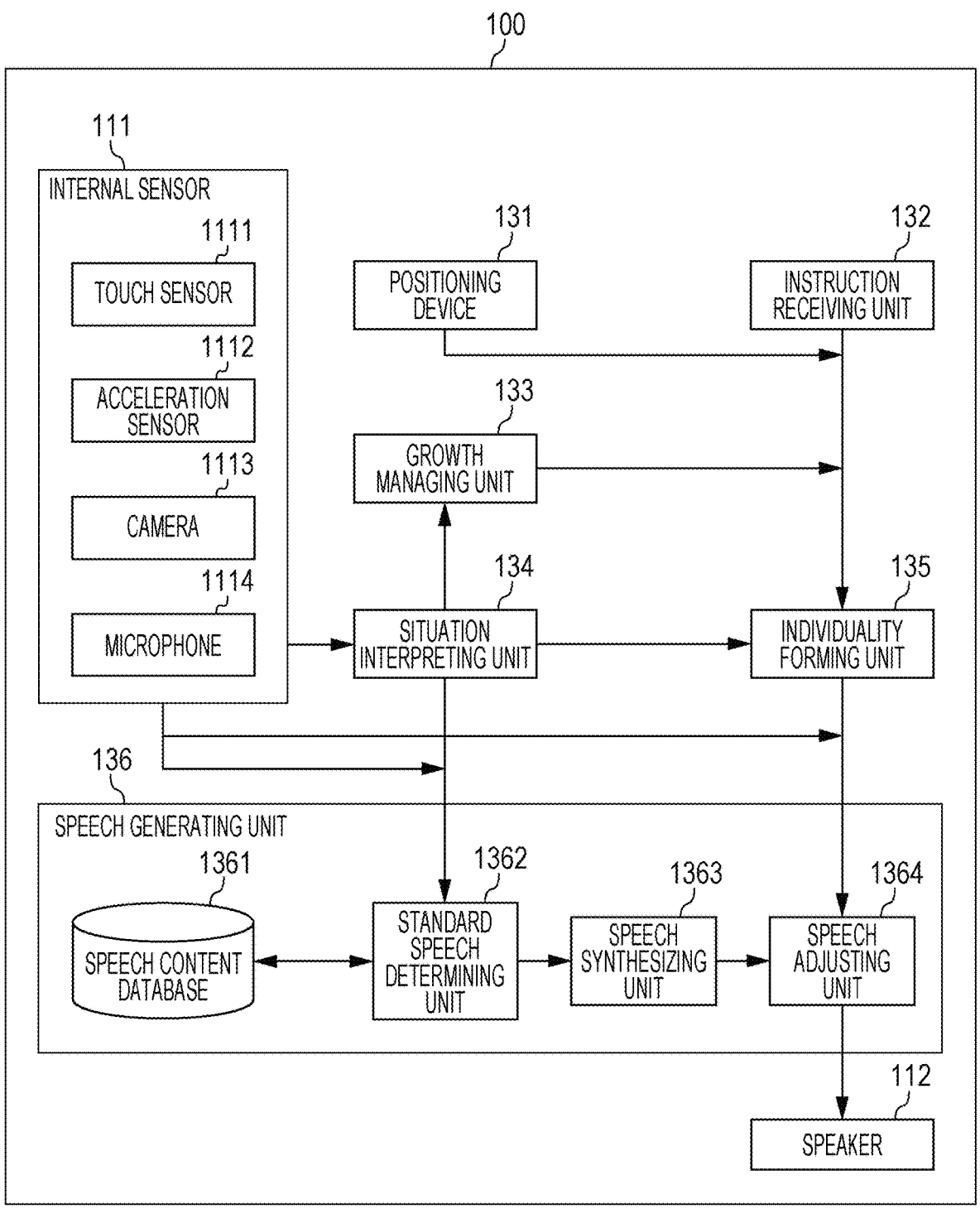
FIG. 5 is a block diagram showing a configuration for outputting speech in the robot.

FIG. 5 is a block diagram showing a configuration for outputting speech in the robot 100. The robot 100 includes the internal sensor 111, a positioning device 131, an instruction receiving unit 132, a growth managing unit 133, a situation interpreting unit 134, an individuality forming unit 135, a speech generating unit 136, and the speaker 112 acting as a speech output unit.

The speech generating unit 136 includes a speech content database 1361, a standard speech fixing unit 1362, a speech synthesizing unit 1363, and a speech adjusting unit 1364. The growth managing unit 133, the situation interpreting unit 134, the individuality forming unit 135, the standard speech fixing unit 1362, the speech synthesizing unit 1363, and the speech adjusting unit 1364 are software modules realized by the processor 115 executing the speech generation program of the embodiment.

Also, the speech content database 1361 is configured of the storage device 114. The instruction receiving unit 132 being a unit that receives an instruction using communication, the communication unit 113 corresponds thereto. In particular, the instruction receiving unit 132 of the embodiment receives an instruction from a user regarding a formation of individuality by the individuality forming unit 135.

The internal sensor 111 detects various physical quantities in an external environment of the robot 100 (that is, external environmental information), and outputs sensor information indicating environmental information (that is, a sensor detection value). The internal sensor 111 includes a touch sensor 1111, an acceleration sensor 1112, a camera 1113, and a microphone 1114. Although the aforementioned sensors are shown in FIG. 5 as sensors relating to speech output in the embodiment, speech may be output based on sensor information from another previously mentioned sensor.

Also, although only one touch sensor 1111 is shown in FIG. 5, the touch sensor 1111 may be provided in each of a back head portion, a face, a right arm, a left arm, an abdominal portion, a back, and the like, of the robot 100. The touch sensor 1111 is a capacitive touch sensor, and when a user comes into contact with a relevant portion of the robot 100, the touch sensor 1111 detects this, and outputs sensor information indicating that there has been a contact.

Also, although only one acceleration sensor 1112 is shown in FIG. 5, the acceleration sensor 1112 may include three acceleration sensors detecting an acceleration in each of an up-down direction, a left-right direction, and a front-back direction. The three acceleration sensors 1112 output an acceleration in one each of the up-down direction, the left-right direction, and the front-back direction as sensor information. As the acceleration sensor 1112 also detects gravitational acceleration, a posture (orientation) of the robot 100 when the robot 100 is stationary, and a direction of movement when the robot 100 has moved, can be obtained based on accelerations of the three acceleration sensors 1112, whose axial directions are perpendicular to each other.

The camera 1113 is provided in the horn 109, and films all regions above the robot 100 at one time, as heretofore described. The camera 1113 outputs an image obtained by filming as sensor information. The microphone 1114 converts a sound into an electrical signal, and outputs the electrical signal as sensor information.

The situation interpreting unit 134 interprets a semantic situation in which the robot 100 is being placed based on sensor information from the various kinds of sensor 1111 to 1114. Because of this, the situation interpreting unit 134 accumulates sensor information for a certain period output from the internal sensor 111.

For example, when the acceleration sensor 1112 detects that the robot 100 has moved in an upward direction in a state wherein the touch sensor 1111 is detecting that the robot 100 is being touched, after which there is a gentle acceleration change, the situation interpreting unit 134 interprets the situation as being that the robot 100 is being hugged by a user.

In addition, the situation interpreting unit 134 can interpret a situation as being that the robot 100 is being stroked by a user based on sensor information from the touch sensor 1111, and can interpret a situation as being that the robot 100 is being spoken to based on sensor information from the microphone 1114. In this way, interpretation of a semantic situation means, for example, that rather than sensor information simply being treated as it is, various kinds of sensor information are used as appropriate in accordance with a posture, a situation, and a state of the robot 100 to be determined, whereby the posture of the robot 100 is identified, the situation in which the robot 100 is being placed is identified, and the state of the robot 100 is determined. The situation interpreting unit 134 outputs interpreted details in order that the interpreted details can be utilized as an event in a processing at a subsequent stage.

A candidate for a semantic situation to be interpreted is stored in the situation interpreting unit 134. The situation interpreting unit 134 infers a semantic situation from among multiple candidates prepared in advance based on multiple items of sensor information. With various kinds of sensor information as inputs, a lookup table, a decision tree, a support vector machine (SVM), a neural network, or another method, may be used for the inference.

Although a depiction is omitted from FIG. 5, a semantic situation interpreted by the situation interpreting unit 134 is also reflected in an action or gesture other than speech of the robot 100. That is, the robot 100 interprets a semantic situation from a physical quantity of the external environment detected by the internal sensor 111, and executes a reaction to the external environment. For example, when interpreting that the robot 100 is in a situation of being hugged, a control such as closing the eyes is carried out as a reaction. Speech output described in this embodiment is also one reaction to the external environment.

The growth managing unit 133 manages growth of the robot 100. The robot 100 grows in accordance with details and a quantity of experiences of interpreting a semantic situation in which the robot 100 is being placed based on sensor information from the internal sensor 111, and executing a reaction. This "growth" is expressed using a growth parameter.

The growth managing unit 133 carries out a process of updating and storing the growth parameter. The growth managing unit 133 may manage a multiple of growth parameters. The growth managing unit 133 may, for example, manage growth parameters expressing emotional growth and physical growth individually. Physical growth is, for example, speed when moving, wherein, for example, control may be such that the robot 100 does not output a maximum speed that can be output at first, but the output speed increases as the robot 100 grows. Also, the growth managing unit 133 holds a date and time of a power supply being turned on, and manages a time elapsed from the date and time of the power supply being turned on until the present. The growth managing unit 133 manages a growth parameter correlated to the time elapsed. For example, growth parameters expressing emotional growth and physical growth individually may be managed by the growth managing unit 133.

The individuality forming unit 135 forms individuality of the robot 100. Individuality of the robot 100 is expressed by at least one kind of individuality parameter. The individuality forming unit 135 forms individuality based on a situation (experience) interpreted using the situation interpreting unit 134 and a growth parameter managed by the growth managing unit 133. In order to do this, the individuality forming unit 135 accumulates semantic situations interpreted using the situation interpreting unit 134 over a certain period.

In the embodiment, the robot 100 has no individuality at first, that is, at a point at which the power supply is turned on, and individuality parameters are the same in any robot 100. The robot 100 forms individuality based on semantic situations interpreted by the situation interpreting unit 134, and establishes the formed individuality in accordance with a growth parameter. Specifically, the individuality forming unit 135 causes an individuality parameter to gradually change from an initial value based on accumulated semantic situations, reduces the change in the individuality parameter in accompaniment to an updating (growth) of a growth parameter, and eventually establishes the individuality parameter.

Herein, "individuality" in the embodiment means, for example, being distinguishable from another individual, and having identity in the same individual. That is, even when a multiple of individuals interpret the same semantic situation based on sensor information, the multiple of individuals (robots 100) can be said to be distinguishable when the multiple of individuals react in differing ways. Also, when multiple kinds of reaction by the same individual have commonality, the individual can be said to have identity. Note that with regard to a demand for distinctiveness, it is permissible that combinations of multiple individuals whose individualities are the same exist at a sufficiently low probability.

The individuality forming unit 135 updates and stores an individuality parameter expressing individuality. The individuality forming unit 135 may treat multiple kinds of individuality parameter. In the embodiment, "voice quality" is included in individuality formed by the individuality forming unit 135. In addition to this, character (wanting company, being lively, being short-tempered, being easygoing, and the like), physical ability (maximum speed of movement, and the like), and the like may be included as individuality.

When there is one kind of individuality parameter, individuality expressed by the individuality parameter may be individuality that has no meaning. Also, individuality parameters may be continuous, and individuality may be formed by multiple kinds being prepared as candidates, and the individuality forming unit 135 selecting from among the candidates. For example, when individuality is expressed by one kind of individuality parameter, several tens to several hundred kinds of individuality parameter candidates may be prepared. When there is a number of kinds of candidate in this region, distinctiveness can be realized (that is, the probability of individuality being the same when differing individuals are compared can be sufficiently reduced).

The individuality forming unit 135 may form individuality based on a position of the robot 100 fixed using the positioning device 131. For example, with regard to the individuality "voice quality", a regional accent in accordance with the position (region) of the robot 100 may be formed as individuality. The individuality forming unit 135 may form (set) individuality based on an instruction from the instruction receiving unit 132.

The standard speech fixing unit 1362 determines that speech is to be generated, and fixes the contents of the generated speech. A candidate for the contents of the generated speech is stored as standard speech in the speech content database 1361. The standard speech fixing unit 1362 fixes speech contents to be output by selecting standard speech from the speech content database 1361.

The standard speech fixing unit 1362 determines that speech is to be output, and what the contents thereof are to be, in accordance with an external environment and/or an internal state. The speech generating unit 136 sometimes generates speech consciously, and sometimes generates speech reflexively. Generating conscious speech means that, for example, the standard speech fixing unit 1362 determines that speech is to be generated, and what the contents thereof are to be, based on the internal state of the robot 100 and a semantic situation interpreted by the situation interpreting unit 134. For example, the speech generating unit 136 outputs speech with contents expressing a happy feeling in accordance with the situation interpreting unit 134 interpreting the situation to be that the robot 100 is being hugged.

The standard speech fixing unit 1362 consciously generates speech in accordance with an internal state such as an emotion, which changes in accordance with an external environment obtained as a multiple of sensor values. For example, when the robot 100 is spoken to by a user, the standard speech fixing unit 1362 generates speech responding thereto. Also, the standard speech fixing unit 1362, for example, generates speech with a switching between emotions (internal states) such as enjoyment, sadness, and fear as a trigger, such as when wanting to be noticed by a user, or wanting to express enjoyment using a voice in addition to movement of the arms and legs.

Generating reflexive speech means, for example, determining that speech is to be generated, and what the contents thereof are to be, based on sensor information from the internal sensor 111. As opposed to conscious speech generation, wherein a semantic situation is interpreted from sensor information or an internal state such as an emotion changes, and speech is generated in accordance with that kind of semantic situation or change in an internal state, reflexive speech generation is such that sensor information is reflected as it is in speech generation. An internal state managing unit, which causes an internal state to change based on sensor information indicating environmental information obtained from the internal sensor 111, may be provided.

For example, the speech generating unit 136 outputs speech expressing a surprised reaction in accordance with a large acceleration being applied. Also, the speech generating unit 136 may output predetermined speech in accordance with acceleration of a predetermined value or greater continuing for a predetermined time or longer. A case wherein a large acceleration is applied is, for example, a case wherein the robot 100 is hit, or collides with something. Also, a case wherein acceleration of a predetermined value or greater continues for a predetermined time or longer is, for example, a case wherein the robot 100 is swung around widely, or a case wherein the robot 100 drops from a height. Also, generating speech in such a way that sensor information such as acoustic pressure of a sound detected by a microphone or light intensity (brightness) detected by an illuminance sensor is reflected as it is also corresponds to reflexive speech generation.

In this way, reflexive speech generation is such that speech is generated in such a way that sensor information is reflected as it is, because of which speech in which there is little delay, and that is in accordance with a stimulus received by the robot 100, can be generated. This kind of reflexive speech generation is such that a value of each sensor fulfilling a predetermined condition (for example, reaching a predetermined value or greater) may be a trigger for generating reflexive speech.

Furthermore, for example, when an action such as a movement or a gesture is performed based on an information processing in the interior, rather than as a reaction to an external environment, the standard speech fixing unit 1362 may determine that speech is to be output to correspond to the action. The standard speech fixing unit 1362 may determine that corresponding speech is to be output when, for example, the robot 100 tenses up, or when the robot 100 releases tension from a tensed up state, and fix standard speech. Conversely, a configuration may be such that when the standard speech fixing unit 1362 determines that speech is to be output, an arm or the head is moved in accordance with the output of the speech.

Also, the standard speech fixing unit 1362 may determine that speech is to be output based on a combination of a semantic situation interpreted by the situation interpreting unit 134 and sensor information, and fix corresponding standard speech. For example, the standard speech fixing unit 1362 may determine that corresponding speech is to be output when a state of being rocked up and down continues for a certain period when the situation is interpreted as being that the robot 100 is being held on a knee. A rocking state can be determined by focusing on a temporal change of the acceleration sensor value. A rocking state may be determined by pattern matching of a sensor value waveform, or may be determined based on machine learning.

By considering a sensor value over a certain period in this way, for example, a time until speech is emitted can be caused to change in accordance with familiarity toward a user who is holding the robot 100 on a knee. For example, when there is an experience such that a user has been pleased when speech has been generated in the same situation in the past, speech may be generated in a shorter time based on the experience. In this way, time from an external environment or an internal state changing until speech is generated can be short.

Speech to be consciously output in response to an internal state or to a semantic situation interpreted using the situation interpreting unit 134, and standard speech to be reflexively output in response to sensor information from the internal sensor 111, are stored in the speech content database 1361. These items of speech are simple items of speech of in the region of one to three syllables. For example, the standard speech "Aaah" expressing a feeling of comfort is stored in the speech content database 1361 with respect to a situation of being hugged, and the reflexively emitted standard speech "Ouch!" is stored with respect to a large acceleration. In this way, speech content may be an exclamation, may be a sound such as humming, or may be a noun or an adjective.

Herein, a parameter group for generating speech is stored in the speech content database 1361 of the embodiment, rather than standard speech being stored as speech data such as WAV or MP3. The parameter group is output to the speech synthesizing unit 1363, to be described hereafter. The speech synthesizing unit 1363 carries out a process of generating speech by adjusting a synthesizer using the parameter group. Instead of the embodiment, basic sound data may be held in advance in a format such as WAV using the speech content database 1361, and an adjustment added thereto using the speech adjusting unit 1364.

The speech synthesizing unit 1363 is configured of a synthesizer, and is realized by, for example, software. The speech synthesizing unit 1363 reads a standard speech parameter group fixed using the standard speech fixing unit 1362 from the speech content database 1361, and synthesizes speech using the read parameter group.

The speech adjusting unit 1364 adjusts speech synthesized using the speech synthesizing unit 1363 based on an individuality parameter stored in the individuality forming unit 135. In particular, the speech adjusting unit 1364 carries out adjustment in such a way that it can be recognized that any item of standard speech is speech that is being emitted by the same individual. Also, the speech adjusting unit 1364 changes a tone of voice in accordance with familiarity toward a user who is a communication target.

In order to carry out adjustment of multiple items of standard speech in accordance with an individuality parameter, the speech adjusting unit 1364 carries out a voice quality conversion whereby non-linguistic information such as voice quality or rhythm is adjusted, without causing linguistic (phonemic) information included in the standard speech to change.

Individuality in speech depends on characteristics appearing in a spectrum and a rhythm of the speech. In a case of a living being, spectral characteristics are fixed depending on properties of an articulatory organ of an individual, that is, physical characteristics such as vocal cord or vocal tract form, and appear mainly as differences in individual voice quality. Meanwhile, rhythmic characteristics appear as differences in intonation, syllabic stress, syllabic length, syllabic vibrato, and the like. Consequently, in order to realize a voice quality conversion, the speech adjusting unit 1364 converts spectral characteristics and rhythmic characteristics of standard speech in accordance with individuality formed using the individuality forming unit 135.

Firstly, spectral characteristics will be described. Speech conversion from standard speech to speech of the relevant individual is such that when spectral characteristics (for example, a mel-cepstral coefficient vector or a line spectral frequency vector) of the standard speech at a time t are taken to be $x_t$, and spectral characteristics of the speech of the relevant individual converted from $x_t$ are taken to be $y_t$, a voice quality conversion focused on spectral characteristic conversion is as follows. That is, a conversion function $y_t=F_s(x_t)$ that converts to spectral characteristics that are in accordance with individuality of the relevant individual based on standard speech spectral characteristics is expressed by the following Equation 1.

[Math. 1]

$$F_s(x_t) = \sum_{i=1}^{M} w_i(A_t x_i + b_i) \quad (1)$$

Herein, $A_i$ is a conversion matrix, $b_i$ is bias, and $w_i$ is a weighting coefficient. $A_i$, $b_i$, and $w_i$ are voice quality parameters that fix voice quality. Individuality with respect to voice quality is defined by the voice quality parameters.

At first, an initial value of a voice quality parameter is stored in the individuality forming unit 135, the initial value voice quality parameter is gradually caused to change in accordance with experience and growth, and after a certain time elapses, an amount of the change is gradually reduced. After a certain period elapses, the amount of the change is gradually reduced. That is, the individuality forming unit 135 causes a voice quality parameter to change in accompaniment to an elapse of time. Because of this, voice quality changing in accordance with robot growth, and voice quality stabilizing at a certain point, can be expressed. In this voice quality transformation process, the individuality forming unit 135 creates a difference from a voice quality of another robot. Hereafter, a period until a voice quality stabilizes is called a "transformation period". An initial value of the conversion matrix $A_i$ is a unit matrix, an initial value of the bias $b_i$ is a zero vector, and an initial value of the weighting coefficient $w_i$ is a unit vector.

A voice quality conversion, such as a high/low voice or a filtered voice (a clear voice, a hoarse voice, or the like), can be carried out by the speech adjusting unit 1364 using the conversion of Equation 1. Individual speech can be generated by the voice quality conversion.

Next, rhythmic characteristics will be described. There are various methods of converting rhythmic characteristics in accordance with individuality of an individual. In the embodiment, rhythmic characteristics are expressed by intonation, syllabic stress, syllabic length, syllabic vibrato index, volume, speech rate level, and interval compression level.

FIG. 6 is a table showing a relationship between an intonation pattern and an index. With regard to intonation, intonation patterns formed of a combination of low, intermediate, and high are prepared for each of a case of one syllable, a case of two syllables, and a case of three syllables, and an index Ii1, Ii2, or Ii3 is allotted to each pattern for each number of syllables.

FIG. 7 is a table showing a relationship between a stress pattern and an index. With regard to stress too, stress patterns formed of a combination of weak, intermediate, and strong are prepared for each of a case of one syllable, a case of two syllables, and a case of three syllables, and an index Ia1, Ia2, or Ia3 is allotted to each pattern for each number of syllables.

FIG. 8 is a table showing a relationship between a length pattern and an index. With regard to length too, length patterns formed of a combination of short, intermediate, and long are prepared for each of a case of one syllable, a case of two syllables, and a case of three syllables, and an index Il1, Il2, or Il3 is allotted to each pattern for each number of syllables.

FIG. 9 is a table showing a relationship between a vibrato pattern and an index. With regard to vibrato too, vibrato patterns formed of a combination of present and absent are prepared for each of a case of one syllable, a case of two syllables, and a case of three syllables, and an index Iv1, Iv2, or Iv3 is allotted to each pattern for each number of syllables.

In the embodiment, furthermore, a volume V, a speech rate level S, and an interval compression level C are prepared as rhythmic characteristics. The volume V is a magnitude (volume) of speech. The speech rate level S is a level to which a standard speech enunciation time is compressed. The interval compression level C is a level to which a standard speech interval height difference is reduced. By changing a combination of rhythmic parameters such as intonation, stress, length, vibrato, volume, speech rate level, and interval compression level for each individual in this way, individual speech can be generated.

As another method of converting rhythmic characteristics, there is a method based on vector quantization, a method whereby an average value of a fundamental frequency F0 or a speech rate is simply matched with an average value of the relevant individual, a method whereby the fundamental frequency F0 is subjected to linear transformation with consideration to dispersion, a method based on rhythm generation using hidden Markov model (HMM) speech synthesis, and the like. Also, conversion of both spectral characteristics and rhythmic characteristics can be carried out based on HMM speech synthesis and speaker adaptation.

The individuality forming unit 135 stores the heretofore described voice quality parameters ($A_i$, $b_i$, and $w_i$) and the rhythmic parameters (Ii, Ia1, Ia2, Ia3, Il1, Il2, Il3, Iv1, Iv2, Iv3, V, S, and C) as individuality parameters (hereafter called "individual speech parameters") relating to speech. The speech adjusting unit 1364 reads individual speech parameters from the individuality forming unit 135, and converts standard speech fixed by the standard speech fixing unit 1362 using the individual speech parameters. The individuality forming unit 135 may store a different rhythmic parameter for each item of standard speech stored in the speech content database 1361. By the voice quality parameters and the rhythmic parameters being changed for each individual, individual speech can be generated.

A method whereby the individuality forming unit 135 fixes an individual speech parameter will be described. A rhythmic parameter may be fixed based on a character of an individual. As heretofore described, character in the individuality forming unit 135 changes in accordance with experience and growth, because of which a rhythmic parameter may also change in a character forming process. When obtaining a corresponding rhythmic parameter from a character, a conversion function may be used, or a learning model learned using machine learning may be used.

Also, a rhythmic parameter may be fixed based on a region of an individual. In this case, as heretofore described, the individuality forming unit 135 is acquiring positional information from the positioning device 131, because of which the individuality forming unit 135 fixes a rhythmic parameter based on the positional information in such a way as to correspond to the region. Because of this, adjustment of speech that is in accordance with a region, such as a West Japan accent or a North-East Japan accent, can be carried out. When obtaining a rhythmic parameter from positional information, a lookup table may be used.

Also, an individual speech parameter may be fixed based on an instruction received using the instruction receiving unit 132. For example, when the instruction receiving unit 132 receives an instruction specifying a gender, the individuality forming unit 135 fixes a voice quality parameter or a rhythmic parameter in such a way as to correspond to the specified gender.

In order to carry out the instruction, an information terminal (for example, a smartphone or a personal computer) in which a control application is installed may be used. The information terminal receives an instruction with the control application as a user interface, and transfers the received instruction to the robot 100 as necessary via a network or a relay server. The instruction receiving unit 132 of the robot 100 can receive an instruction transmitted in this way.

Heretofore, the speech adjusting unit 1364 adjusting standard speech based on an individual speech parameter stored in the individuality forming unit 135 has been described. Furthermore, the speech adjusting unit 1364 adjusts rhythm based on sensor information from the internal sensor 111. For example, when acceleration from the acceleration sensor 1112 oscillates in a cycle of a predetermined frequency or greater, the speech adjusting unit 1364 causes speech vibrato in accordance with the oscillation. That is, the speech adjusting unit 1364 causes the magnitude of an interval to change cyclically. Also, volume may be increased, or an interval increased, in accordance with the magnitude of acceleration from the acceleration sensor 1112.

Adjusting speech so as to directly reflect sensor information in this way means that, when comparing with a living being for example, speech adjustment that reflexively reflects a stimulus from an external environment can be carried out. That is, the speech adjusting unit 1364 carries out a speech adjustment based on individuality, and when a predetermined stimulus from an external environment is applied, the speech adjusting unit 1364 also adjusts speech as a reaction to the stimulus.

Generation of individual speech, generation of reflexive speech, and generation of conscious speech are carried out by the speech generating unit 136. That is, speech generated by the speech generating unit 136 is such that even when a sound is the same, a basis for the generation, that is, a trigger or a parameter of the speech generation, differs. A speech generating unit for generating reflexive speech and a speech generating unit that generates conscious speech may be provided as separate speech generating units.

Individual Speech Generation

Individual speech having distinctiveness is generated by the speech generating unit 136. When there are a multiple of robots 100 in a home, speech of each robot 100 is generated in such a way that the voices of individual robots 100 are not the same. In order to realize this, the robot 100 captures the voice of another individual using the microphone 1114, and generates speech in such a way as to differ from the captured voice. The speech generating unit 136 has a comparison unit (not shown) that imports the voice of another individual using the microphone 1114, and compares the voice with the voice of the robot 100 itself to determine whether or not there is a difference in the voices. When it is determined by the comparison unit that there is no difference from the other voice, that is, that there is no distinctiveness, the individuality forming unit 135 changes an individual speech parameter. A speech parameter is changed in accordance with the voice of another individual for an individual that is in the transformation period, and a speech parameter is not changed for an individual that has exceeded the transformation period. Listening to the speech of another individual and creating a voice that is different therefrom while doing so in this way means that although the voices are the same when the power is turned on, individual differences become clear when a certain period has elapsed.

Reflexive Speech Generation

When a person is subjected to a certain kind of external stimulus, the person may subconsciously and reflexively emit speech. This is, for example, when feeling pain or when feeling surprise. A generation of reflexive speech by the speech generating unit 136 resembles this kind of subconscious speech emission. The speech generating unit 136 generates reflexive speech when certain sensor information changes suddenly. In order to realize this, a value of the acceleration sensor 1112, the microphone 1114, or the touch sensor 1111 forms a trigger. Furthermore, the sensor value is also used to fix the volume of generated speech.

For example, when the robot 100 is suddenly lifted up while emitting some kind of speech, the speech generating unit 136 stops the speech being emitted at the time, and generates speech saying "Woah!" emitted when surprised. As another example, the speech generating unit 136, at a point at which the robot 100 is suddenly lifted up, increases the volume of the speech being emitted at the time in conjunction with the magnitude of the acceleration. In this way, a sensor value is linked as it is to speech in reflexive speech generation. Specifically, when the robot 100 is rhythmically emitting a sound as though saying "Brum, brum, brum, brum", and is suddenly lifted up around the third "Bru", the volume of "Brum" at that point suddenly increases, the rhythm is broken, and the robot 100 shouts.

Conscious Speech Generation

Conscious speech generation generates speech that expresses an emotion. In the same way as an atmosphere changes when background music changes in a movie or a drama, it can be thought that a sound of the robot 100 is also one kind of performance. The robot 100 is such that emotion changes like a wave. That is, emotion changes constantly in accordance with a stimulus from an external environment. As emotion changes like a wave, a parameter value indicating an emotion reaches a maximum in a certain situation, after which the parameter value gradually drops as time elapses.

For example, when the robot 100 is surrounded by users, and a large number of smiling faces and laughing voices are detected by the camera 1113 and the microphone 1114, a wave of emotion to the effect that "This is fun" swells up in the robot 100. At this timing, the speech generating unit 136 selects a parameter for a fun time from the speech content database 1361, and generates speech. For example, when being rocked up and down while being held on a knee, the robot 100 interprets the situation, a wave of emotion to the effect that "I'm happy" occurs, and the robot 100 generates speech expressing the emotion "I'm happy". Furthermore, as the acceleration sensor value is indicating a cyclical rocking at this time, the robot 100 begins to add vibrato that is in accordance with the cycle to the speech emission.

Sensor information from the internal sensor 111, such as the acceleration sensor 1112, not only forms a trigger for reflexive speech generation, but also affects speech while speech is being emitted. The effect may be a quantitative condition such as the sensor information exceeding a predetermined value, or an extent of the effect may change qualitatively in accordance with an internal state such as an emotion at the time. By speech being generated using the speech generating unit 136 based on sensor information in this way, the robot 100 generates speech by reflecting sensor information and an internal state in combination, rather than always generating the same speech.

The speaker 112 outputs speech adjusted by the speech adjusting unit 1364.

As heretofore described, the robot 100 of the embodiment generates and outputs speech using the speech generating unit 136, rather than outputting as it is speech prepared as a sound source in advance in order to output speech, because of which a more flexible speech output can be carried out.

Specifically, the robot 100 can output individual speech having distinctiveness and identity. Because of this, a user can recognize his or her own robot 100 as distinct from another robot 100 by listening to speech, because of which the user forming an attachment to the robot 100 can be effectively promoted. Also, the robot 100 can generate speech based on sensor information. Because of this, the robot 100 can output reflexively adjusted speech by causing the voice to tremble in accordance with oscillation, or the like.

In the embodiment, no individuality is formed at first in the robot 100 (in particular, the robot 100 does not have distinctiveness), spectral characteristics and rhythmic characteristics of speech are the same in any robot 100, and individuality is formed in a usage process, but instead of this, a different individuality may be formed in each individual from the start.

Also, in the embodiment, a user can specify individuality using a control application, but instead of this, or in addition to this, a configuration may be such that a user can order a return to an initial value by cancelling the individuality of the robot 100 via a control application.

Alternatively, although no individuality is formed in the robot 100 at first, the individuality forming unit 135 may fix individuality at random when the power supply is first turned on. Furthermore, individuality of the robot 100 may be rendered visible via a control application. In this case, the robot 100 transmits an individuality parameter via the communication unit 113, and the individuality parameter is received and displayed in an information terminal in which a control application is installed.

Also, in the embodiment, the individuality forming unit 135 forms individuality based on a situation interpreted by the situation interpreting unit 134 and a growth parameter managed by the growth managing unit 133, but instead of this, or in addition to this, the individuality forming unit 135 may analyze user speech detected by the microphone 1114, acquire the spectral characteristics and the rhythmic characteristics of the user speech, and fix an individual speech parameter in such a way as to approximate the user speech. By so doing, a performance such that the speech of the robot 100 approximates the user speech can be carried out.

Furthermore, a user reaction when the robot 100 outputs speech may be learned, and reflected in a formation of individuality by the individuality forming unit 135. As user reactions, for example, a user smiling can be detected by carrying out image recognition on an image from the camera 1113, and a user stroking the robot 100 can be detected based on sensor information from the touch sensor 1111.

Also, the embodiment is such that after the contents of speech to be output are fixed by the standard speech fixing unit 1362, the standard speech is adjusted by the speech adjusting unit 1364, and output from the speaker 112, but instead of this, standard speech stored in the speech content database 1361 may be adjusted in advance based on individuality formed by the individuality forming unit 135, and stored in the speech content database 1361. That is, speech generation may be carried out in advance, rather than immediately before the speech is output.

In this case, when the standard speech fixing unit 1362 determines that speech is to be output, and what the contents thereof are to be, speech already adjusted to correspond to the speech contents may be output from the speaker 112. In this case too, the speech adjusting unit 1364 may carry out reflexive adjustment of the speech based on sensor information.

Also, in the embodiment, the growth managing unit 133, the situation interpreting unit 134, the individuality forming unit 135, and the speech generating unit 136 are all included in the robot 100, but one portion or all thereof may be included in a device that is separate from the robot 100, and that can communicate with the robot 100. This kind of device may carry out short-range communication with the robot 100 using Wi-Fi (registered trademark) or the like, or may carry out communication via a wide-area network such as the Internet.

Robot Having Virtual Vocal Organs

Generally, speech emitting processes of living beings that have vocal organs are the same. For example, a human speech emitting process is such that a sound is emitted by air led through the trachea from a lung or an abdominal portion vibrating in the vocal cords, and the sound resonates in the oral cavity, the nasal cavity, or the like, becoming a large sound. Further, various voices are created by a form of the mouth or the tongue changing. Individual differences in voices are created by various differences such as body size, lung capacity, vocal cords, trachea size, oral cavity size, nasal cavity size, tooth alignment, how the tongue is moved, and the like. Also, even within the same person, a state of the trachea, the vocal cords, and the like changes in accordance with physical condition, and the voice changes. According to this kind of speech emitting process, voice quality changes from person to person, and a voice also changes in accordance with physical condition or an internal state such as an emotion.

Based on this kind of speech emitting process, the speech synthesizing unit 1363 in another embodiment generates speech by simulating a speech emitting process in virtual vocal organs. That is, the speech synthesizing unit 1363 is virtual vocal organs, and generates a voice with the virtual vocal organs, which are realized by software. For example, the virtual vocal organs may be of a structure that resembles human vocal organs, or may be of a structure that resembles vocal organs of an animal such as a dog or a cat. Having virtual vocal organs means that although a basic vocal organ structure is the same, speech unique to an individual can be generated by changing the size of the trachea in the virtual vocal organs, adjusting an amount of tension of the vocal cords, or changing the size of the oral cavity for each individual. A parameter group for generating speech held in the speech content database 1361 does not simply include direct parameters for generating a sound with a synthesizer, but also includes values that specify structural characteristics of each organ in the virtual vocal organs as parameters (hereafter called "static parameters"). Using these static parameters, a speech emitting process is simulated, and a voice is generated.

For example, a person can output various kinds of voice. A high voice, a low voice, singing along to a melody, laughing, or shouting, any kind of voice can be output within limits permitted by the structure of the vocal organs. This is because a form or a state of each organ configuring the vocal organs changes, and while a person can consciously cause the vocal organs to change, the vocal organs may also change subconsciously in response to an emotion or a stimulus. The speech synthesizing unit 1363 also has parameters (hereafter called "dynamic parameters") relating to a state of this kind of organ that changes in conjunction with an external environment or an internal state, and carries out a simulation by causing the dynamic parameters to change in conjunction with an external environment or an internal state.

In general, when the vocal cords are tautened, the vocal cords lengthen, and a high sound is formed, and when the vocal cords are relaxed, the vocal cords contract, and a low sound is formed. For example, an organ resembling a vocal cord has a degree of vocal cord tautening (hereafter called "tautness") as a static parameter, and a high voice or a low voice can be emitted by the tautness being adjusted. Because of this, the high-voiced robot 100 and the low-voiced robot 100 can be realized. Also, a voice sometimes cracks due to a person being tense, and in the same way, by causing the vocal cord tautness acting as a static parameter to change in conjunction with a state of tenseness of the robot 100, the voice can become high when the robot 100 is tense. For example, when an internal parameter indicating a state of tenseness swings toward a value indicating that the robot 100 is tense, such as when the robot 100 recognizes an unknown person or when the robot 100 is suddenly lowered from a state of being hugged, the tautness of the vocal cords is increased in conjunction therewith, whereby a high voice can be emitted. By an internal state of the robot 100 and an organ of the speech emitting process being correlated in this way, and a parameter of the correlated organ being adjusted in accordance with the internal state, the voice can be changed in accordance with the internal state.

Herein, a static parameter and a dynamic parameter are parameters that indicate a geometric state of each organ accompanying an elapse of time. Virtual vocal organs carry out a simulation based on these parameters.

Also, by speech being generated based on a simulation, only speech based on a structural limitation of the vocal organs is generated. That is, no voice infeasible as that of a living being is generated, because of which a voice like that of a living being can be generated.

Figure 10:
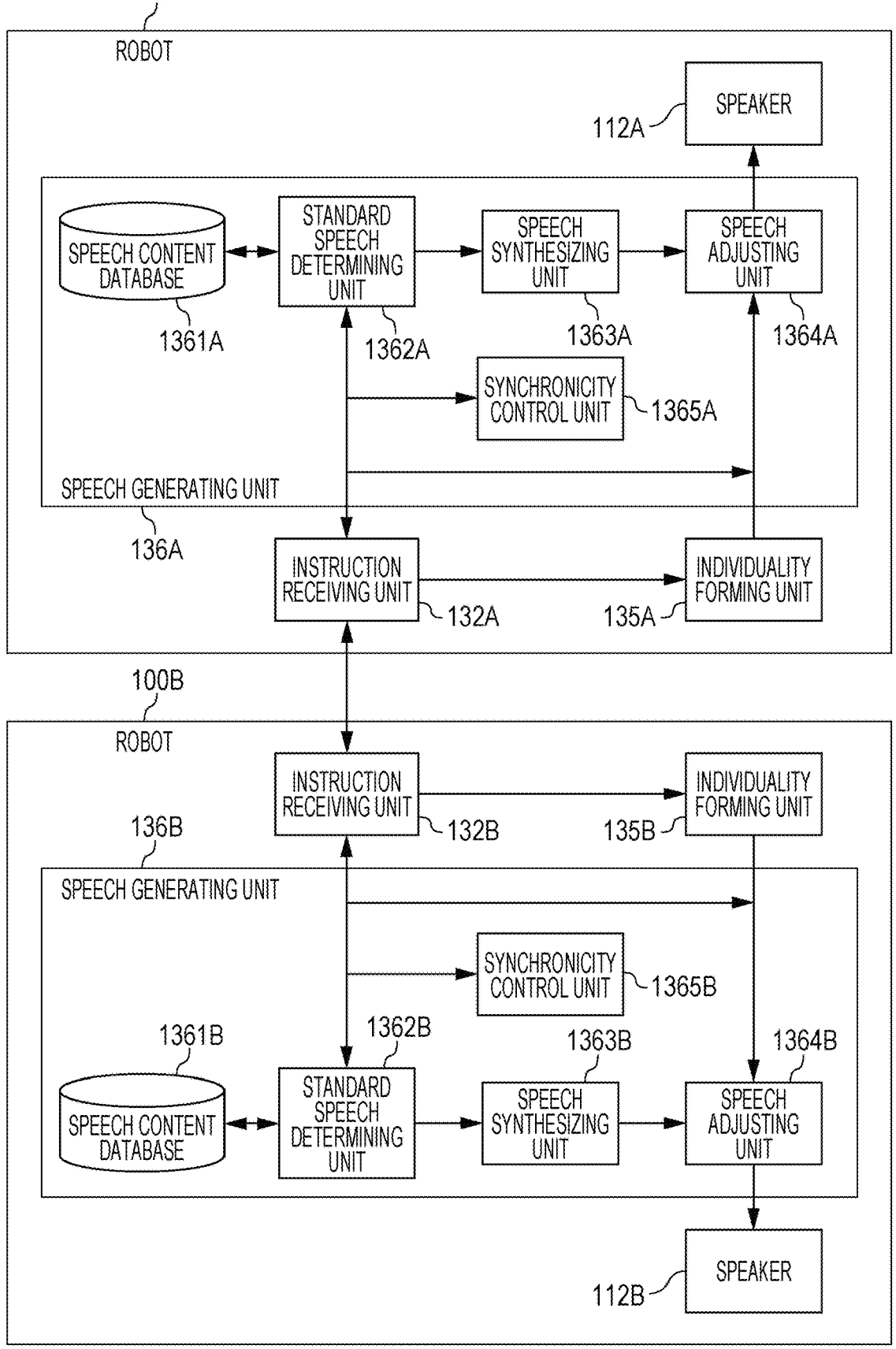
FIG. 10 is a block diagram showing a configuration of a multiple of robots that can carry out synchronous speech emission.

Synchronous Speech Emission by Multiple Robots FIG. 10 is a block diagram showing a configuration of a multiple of robots that can carry out synchronous speech emission. In the example of FIG. 10, a robot 100A and a robot 100B carry out synchronous speech emission. The robot 100A and the robot 100B have the same configuration. In the same way as in the heretofore described embodiment, the robot 100A and the robot 100B include instruction receiving units 132A and 132B, individuality forming units 135A and 135B, speech generating units 136A and 136B, and speakers 112A and 112B. In the same way as in the heretofore described embodiment, each of the robot 100A and the robot 100B further includes the internal sensor 111, the positioning device 131, the growth managing unit 133, and the situation interpreting unit 134, but these are omitted from FIG. 10.

As heretofore described, the instruction receiving units 132A and 132B correspond to the communication unit 113 (refer to FIG. 4), which carries out wireless communication. In this embodiment, the instruction receiving units 132A and 132B can carry out wireless communication with each other. In this embodiment, in order to realize synchronous speech emission with the two robots 100A and 100B, contents of speech generated by the standard speech fixing unit 1362 are fixed in one robot, together with which speech conditions formed of a set of speech output start timings of the robot itself and the other robot and at least one portion of speech parameters are fixed, and the other robot outputs speech in accordance with the speech conditions fixed by the one robot. In this embodiment, an example wherein speech conditions are fixed by the robot 100A, and the robot 100B outputs speech in accordance with the speech conditions, will be described.

A standard speech fixing unit 1362A of the robot 100A fixes details of speech generated by the robot 100A, and fixes speech conditions including a speech output start timing of each of the robot 100A and the robot 100B and at least one portion of speech parameters. That is, the robot 100A fixes a speech condition (a second speech condition) including an output start timing (a second output start timing) for the robot 100A and a speech condition (a first speech condition) including an output start timing (a first output start timing) for the robot 100B. The instruction receiving unit 132A of the robot 100A transmits the first speech condition toward the robot 100B.

The instruction receiving unit 132B of the robot 100B receives the first speech condition from the robot 100A, and a standard speech fixing unit 1362B of the robot 100B recognizes the at least one portion of speech parameters included in the received first speech condition. Also, a synchronicity control unit 1365B of the robot 100B recognizes the first output start timing included in the received first speech condition. The standard speech fixing unit 1362B and the synchronicity control unit 1365B correspond to a speech generation condition recognizing unit.

A speech adjusting unit 1364A of the robot 100A generates speech that coincides with the at least one portion of speech parameters included in the second speech condition fixed by the standard speech fixing unit 1362A. A speech adjusting unit 1364B of the robot 100B generates speech that coincides with a set of the at least one portion of speech parameters included in the first speech condition recognized by the standard speech fixing unit 1362B.

A synchronicity control unit 1365A of the robot 100A outputs speech generated by the speech adjusting unit 1364A to the speaker 112A in accordance with the second output start timing included in the second speech condition fixed by the standard speech fixing unit 1362A. The synchronicity control unit 1365B of the robot 100B outputs speech generated by the speech adjusting unit 1364A to the speaker 112B in accordance with the first output start timing included in the first speech condition.

The one portion of speech parameters included in the speech condition fixed by the standard speech fixing unit 1362A is a tempo expressed by BPM, a rhythm, a pitch, a length of speech contents (for example, a number of syllables), a tone, a volume, or a temporal change pattern of at least one kind of element among these elements. In the same way as in the heretofore described embodiment, each of the speech adjusting units 1364A and 1364B converts spectral characteristics and rhythmic characteristics of standard speech in accordance with individuality formed using the individuality forming unit 135, thereby adjusting standard speech fixed by the standard speech fixing units 1362A and 1362B in accordance with individuality parameters formed by the individuality forming units 135A and 135B, and carrying out a voice quality conversion such that non-linguistic information such as voice quality or rhythm is adjusted without causing linguistic (phonemic) information included in the standard speech to change. At this time, the speech adjusting units 1364A and 1364B adjust a speech parameter (for example, a tempo, a rhythm, a pitch, a number of syllables, a tone, a volume, or a temporal change pattern thereof) specified in a speech condition in accordance with the speech condition, and adjust other speech parameters in accordance with individuality parameters.

Specifically, the standard speech fixing unit 1362A can, for example, fix the output start timing of each of the robot 100A and the robot 100B in such a way that speech is output at the same timing by the robot 100A and the robot 100B. By so doing, the robot 100A and the robot 100B can be caused to emit speech at the same timing.

Alternatively, the standard speech fixing unit 1362A may fix the respective output start timings (the first output start timing and the second output start timing) of the robot 100A and the robot 100B in such a way that the robot 100A and the robot 100B output speech at timings that deviate by a predetermined time. For example, the standard speech fixing unit 1362A may fix the speech output start timing of each robot in such a way that when the speech output of one robot finishes, the other robot outputs speech.

Specifically, the standard speech fixing unit 1362A can, for example, fix a pitch (a second pitch) as one portion of speech parameters of the robot 100A and a pitch (a first pitch) as one portion of speech parameters of the robot 100B in such a way that speech of the same pitch is output by the robot 100A and the robot 100B. Alternatively, the standard speech fixing unit 1362A may fix the first pitch and the second pitch in such a way that the robot 100A and the robot 100B output speech of differing pitches. In this case, the first pitch and the second pitch may have a predetermined relationship.

For example, the standard speech fixing unit 1362A may fix the speech parameters in such a way that a ratio between the second pitch (frequency) and the first pitch (frequency) is included in a predetermined range. For example, the second pitch and the first pitch may have a relationship such that an interval (a pitch ratio) is a consonant interval. By two items of speech with consonant intervals being output at the same timing, harmony can be created. The consonant interval may be an imperfect consonant interval, a perfect consonant interval, or an absolute consonant interval. Also, when wishing to express immaturity of the robot 100A and the robot 100B, the interval may be a dissonant interval.

For example, the standard speech fixing unit 1362A may fix the speech parameters in such a way that the second pitch (frequency) is higher or lower than the first pitch (frequency) by a predetermined interval (for example, three degrees) or a predetermined frequency.

Also, the robot 100A and the robot 100B may individually fix pitch and generate speech, without pitch being specified by a speech parameter. In this case, for example, the following kind of process may be carried out. For example, it is assumed that identical tempos have been specified by speech parameters. Before outputting speech, the robot 100A generates speech in such a way as to coincide with the specified tempo. The robot 100A transmits a temporal change of the pitch at which speech is to be output to the robot 100B via communication. The robot 100B may generate speech to be output by the robot 100B in such a way that a ratio (interval) of a pitch to be output at the same timing with respect to the pitch of the speech generated by the robot 100A is included in a predetermined range, and in such away as to coincide with the specified tempo. In this case, based on the temporal change of the pitch of the speech generated by the robot 100A, the robot 100B may generate a list of pitches to be output at the relevant timings in such a way that the ratio between pitches output at the same timing is included within a predetermined range, and select the pitch to be output at the relevant timing from the list.

Also, the robot 100A and the robot 100B may each independently generate speech in such a way as to coincide with a speech parameter, share the generated items of speech via communication before outputting the speech, fix with regard to a temporal change of the items of speech whether or not the ratio between pitches of the items of speech is included in a predetermined range at each timing, and when the ratio between pitches is not included in the predetermined range, correct one pitch in such a way as to become a predetermined interval (for example, one octave) or a predetermined frequency higher or lower, in order that the ratio between pitches is included in the predetermined range. The same kind of process may be carried out with the condition that the ratio between pitches is included in the predetermined range replaced with a condition that a frequency difference is included in a predetermined range. The predetermined range may be, for example, a range specified by both a lower limit value and an upper limit value, a range specified by a lower limit value or an upper limit value only, a continuous range, or an intermittent range.

Also, when one portion of speech parameters fixed by the standard speech fixing unit 1362A of the robot 100A is a number of syllables, the number of syllables of the robot 100A and the number of syllables of the robot 100B may be the same. Also, when one portion of speech parameters is a number of syllables, speech contents may be fixed at random in accordance with the number of syllables.

The standard speech fixing unit 1362A fixes at least contents of speech to be emitted by the robot 100A. The standard speech fixing unit 1362A may also fix contents of speech to be emitted by the robot 100B as one portion of speech parameters. In this case, the speech contents of the robot 100A and the speech contents of the robot 100B may be the same. In this case, the robot 100A may fix the speech contents at random. Also, when the robot 100B fixes the speech contents, the robot 100B may also fix the speech contents at random.

Also, by the robot 100A and the robot 100B outputting speech at timings that deviate from each other, and arranging that contents of the speech are specific contents, the robot 100A and the robot 100B may carry out a predetermined operation by planning the timing. For example, the robot 100A and the robot 100B may cause a call of rock, paper, scissors to be completed by speech conditions being fixed in such a way that the robot 100A outputs speech saying "rock, paper", and the robot 100B outputs speech saying "scissors" at a timing at which the speech output has ended.

When contents of speech of the robot 100B are not fixed using the standard speech fixing unit 1362A, the standard speech fixing unit 1362B of the robot 100B fixes contents of speech by itself. In this case, when a number of syllables is included as one portion of speech parameters, the standard speech fixing unit 1362B may fix speech contents that coincide with the number of syllables in accordance with previously collected speech (for example, user speech). That is, in order to recreate speech contents often used by a user, or one portion thereof, the speech contents may be contents learned from speech collected by a microphone. Also, speech contents may be fixed by the standard speech fixing unit 1362A or the standard speech fixing unit 1362B in such away as to recreate speech contents, or one portion thereof, collected when user speech satisfies a predetermined condition (like a case wherein the probability that the user is singing is high, such as when pitch is included in a predetermined range).

Recreation of speech contents not being the only object, the individuality forming unit 135 may form individuality based on a pitch or an interval of collected user speech in such away as to recreate the pitch or the interval, and carry out a generation or a correction of speech in accordance with the individuality.

In the above description, speech conditions are fixed by the robot 100A, and the robot 100B generates and outputs speech in accordance with the speech conditions fixed by the robot 100A, but the robot 100B can also fix speech conditions, in which case the robot 100A generates and outputs speech in accordance with the speech conditions fixed by the robot 100B.

The heretofore described example is such that when there are a multiple of robots, one of the robots fixes speech conditions, and transfers the speech conditions to another robot, but instead of this, speech conditions of each robot may be fixed by a control device with which the multiple of robots can communicate, and transmitted to the relevant robot. In this case, the control device may fix and transmit common speech conditions for the multiple of robots, or may fix different speech conditions for each robot, and transmit the speech conditions individually.

Individuality Setting by User

As heretofore described, the individuality forming unit 135 may form (set) individuality of speech based on an instruction from the instruction receiving unit 132, and hereafter, an example wherein the individuality forming unit 135 sets an individuality parameter based on a user instruction will be described. In this case, an information terminal (for example, a smartphone or a personal computer) in which a control application is installed may be used as a device that issues an instruction to the instruction receiving unit 132. The information terminal receives an instruction with the control application as a user interface, and transfers the received instruction to the robot 100 as necessary via a network or a relay server. The instruction receiving unit 132 of the robot 100 can receive an instruction transmitted in this way.

FIG. 11 and FIGS. 12A to 12D are examples of a control application screen (hereafter called an "application screen") relating to a speech setting displayed in a terminal device 204 of this embodiment. A configuration of an application image shown in FIG. 11 and FIGS. 12A to 12D, and a speech setting method in which an application screen is used, are examples, and are not limiting.

Figure 11:
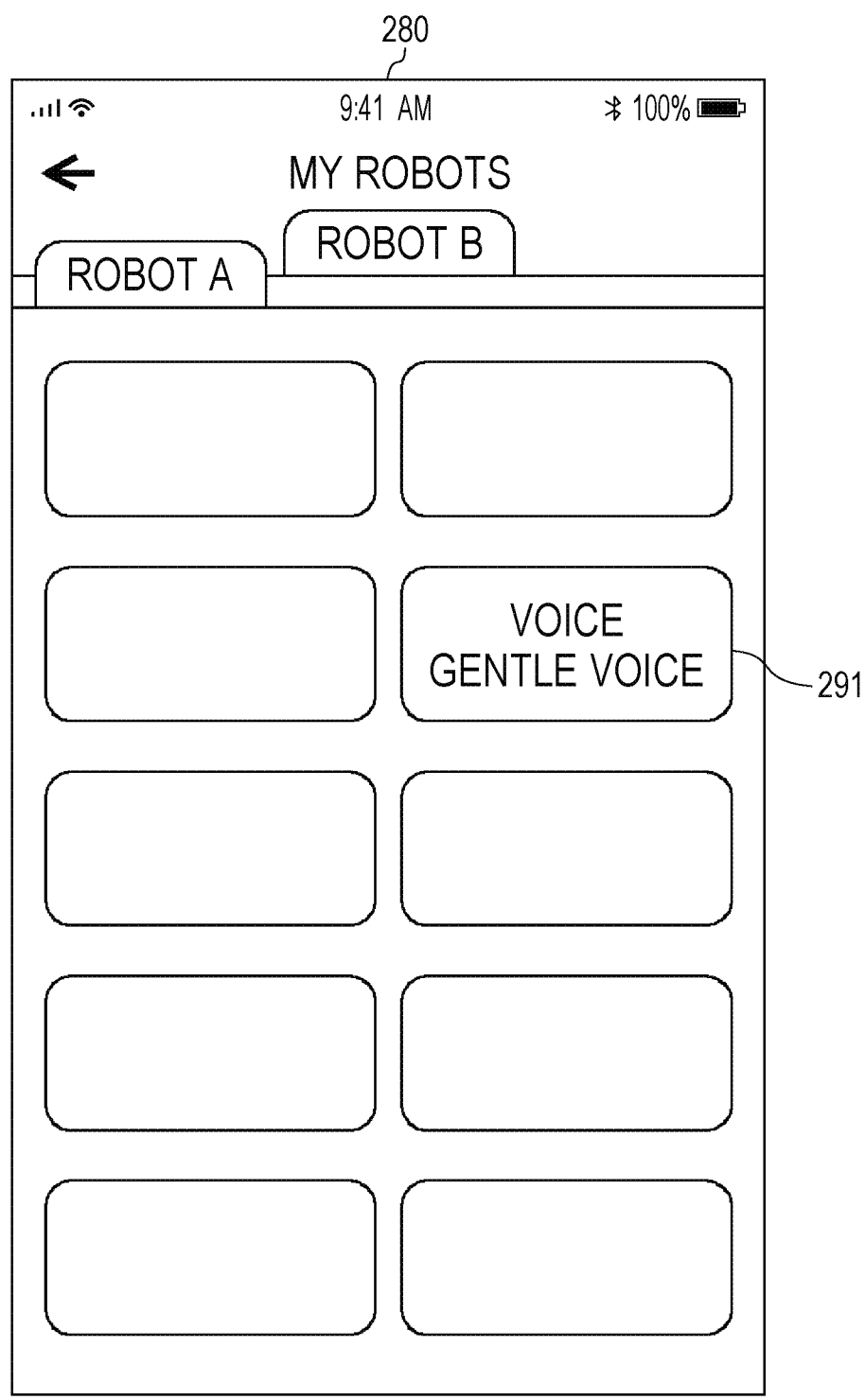
FIG. 11 is a drawing showing an example of a screen showing a state of a robot in a robot control application.

FIG. 11 is a drawing showing an example of a screen showing a state of a robot in a robot control application. The control application is such that a state of a robot A or a robot B can be indicated by selecting a tag. Various kinds of state of the robot 100 selected using the tag are indicated by icons. A robot voice is included in a state of the robot 100 indicated by an application screen 280. Icon 291 indicates a state of the voice of the robot 100, and in the example of FIG. 11, it is shown that a "gentle voice" has been selected as the voice of the robot 100. A voice setting can be carried out by a user pressing the icon 291.

Figure 12A:
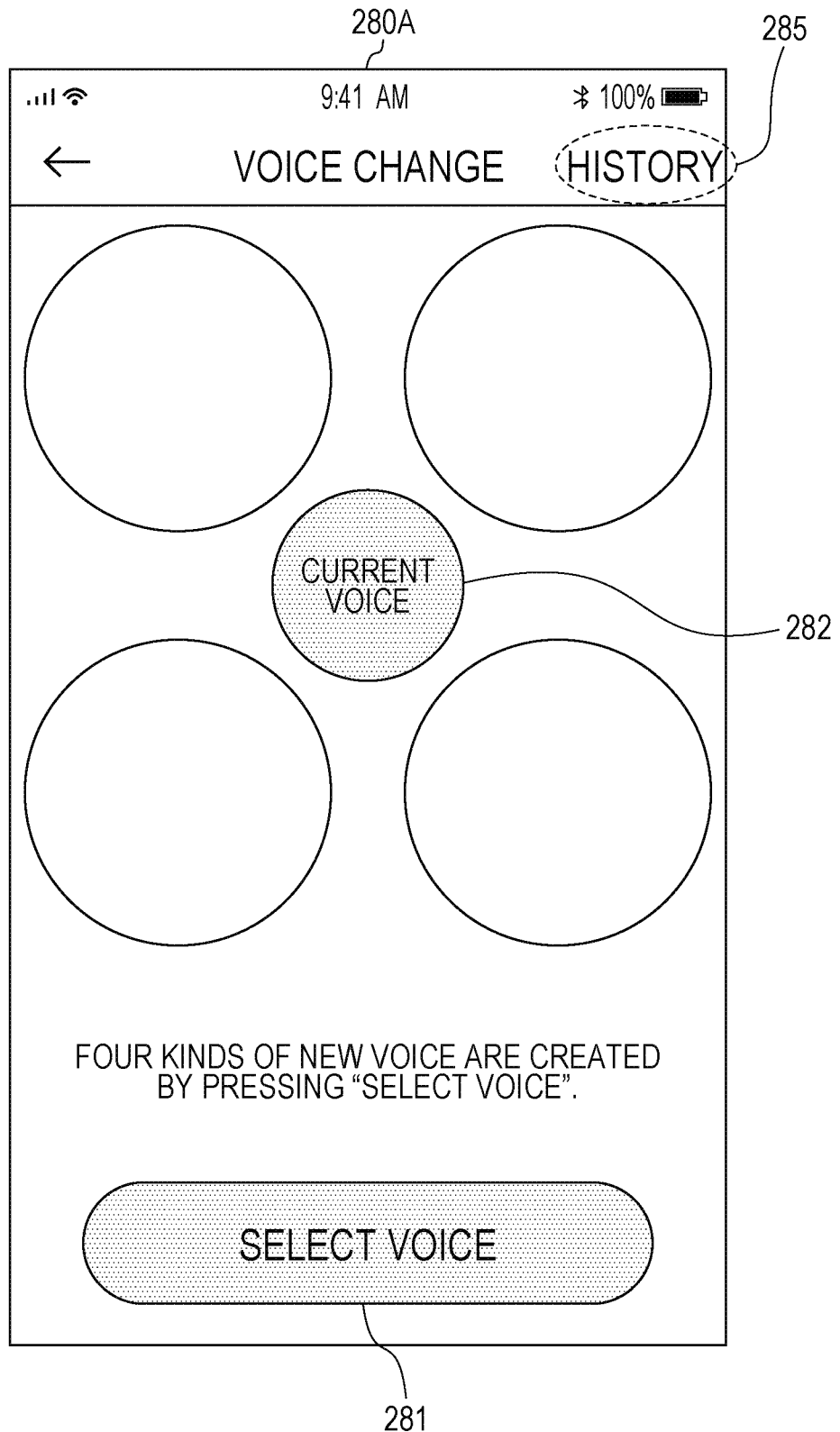
FIG. 12A is a drawing showing an example of an application screen relating to a speech setting.

FIG. 12A is an example of an application screen when carrying out a speech setting. When a user presses a button 281, on which "Select voice" is written, individuality parameters for generating multiple kinds (four kinds in this embodiment) of individual speech at random are automatically generated. The generated individuality parameters are all individuality parameters that do not duplicate an individuality parameter currently set for another robot 100. When the button 281 is pressed by a user, and multiple kinds (four kinds in this embodiment) of speech are generated, an application screen 280A changes to an application screen 280B shown in FIG. 12B. The individuality parameters will be described hereafter.

Also, when a user presses a button 282, on which "Current voice" is written, displayed on the application screen 280A, the user can confirm speech generated based on an individuality parameter currently set for the robot 100. The speech for confirmation is output from the speaker 112 of the robot 100, which is an output device that can be perceived by the user.

Figure 12B:
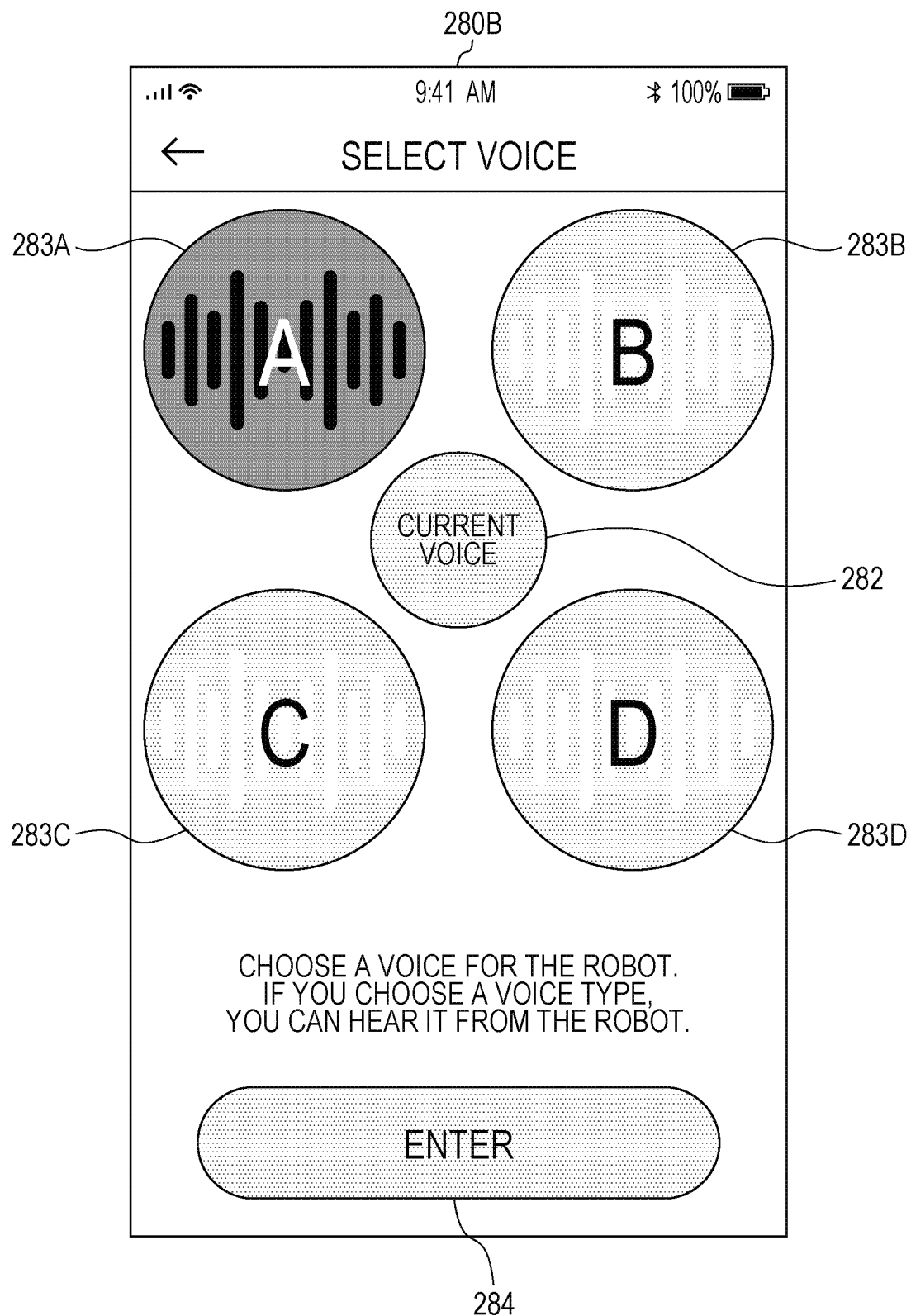
FIG. 12B is a drawing showing an example of an application screen displayed in accordance with an operation of the application screen shown in FIG. 12A.

Speech selection buttons 283A to 283D, with which a user can select one of the multiple of individuality parameters generated, are displayed on the application screen 280B shown in FIG. 12B. When one of the speech selection buttons 283A to 283D is selected by being pressed by a user, corresponding speech is output. Because of this, the user can confirm what speech he or she prefers. When a button 284, on which "Enter" is written, is pressed by a user in a state wherein one of the speech selection buttons 283A to 283D has been selected, the individuality parameter selected by the user is set for the robot.

A button for regenerating individuality parameters (hereafter called a "Regeneration button") may be displayed on the application screen 280B. A case in which a user presses the regeneration button is a case wherein an individuality parameter that generates speech preferred by the user has not been generated. When the regeneration button is pressed by a user, an individuality parameter generation is newly carried out, and the new individuality parameters generated are correlated to the speech selection buttons 283A to 283D.

A multiple of vertical bar objects that carry out movement reflecting an element of a sound that is an individuality parameter of each are aligned on the speech selection buttons 283A to 283D. Lengths of the vertical bar objects are dynamically caused to change continuously. A change in the length of a vertical bar object has continuity with a change in the length of a neighboring vertical bar object (the same kind of change with a time difference, or the like), because of which a sound-like (waveform) effect can be expressed by the multiple of aligned vertical bar objects.

A speed at which a wave of each vertical bar object passes, that is, a time until one change is reflected in a neighboring vertical bar object, represents a speed of speech. Also, a basic length of a vertical bar object, that is, the length of the vertical bar object when not changed, represents a pitch of speech. Also, fluctuation in a wave of a vertical bar object, that is, an amount of change in the vertical bar object, represents a pitch width of speech. Also, a color of a vertical bar object represents brightness of speech. Also, attenuation and bounce of a vertical bar object represent a lip reflection of speech. That is, an amount of attenuation of an amount of change in a vertical bar object is such that when attenuation is large, the display is such that after a wave occurs, the time elapsing until the wave dies down is short, and when attenuation is small, the display is such that after a wave occurs, the time elapsing until the wave dies down is long. Also, a line thickness of a vertical bar object represents a vocal tract length.

Figure 12C:
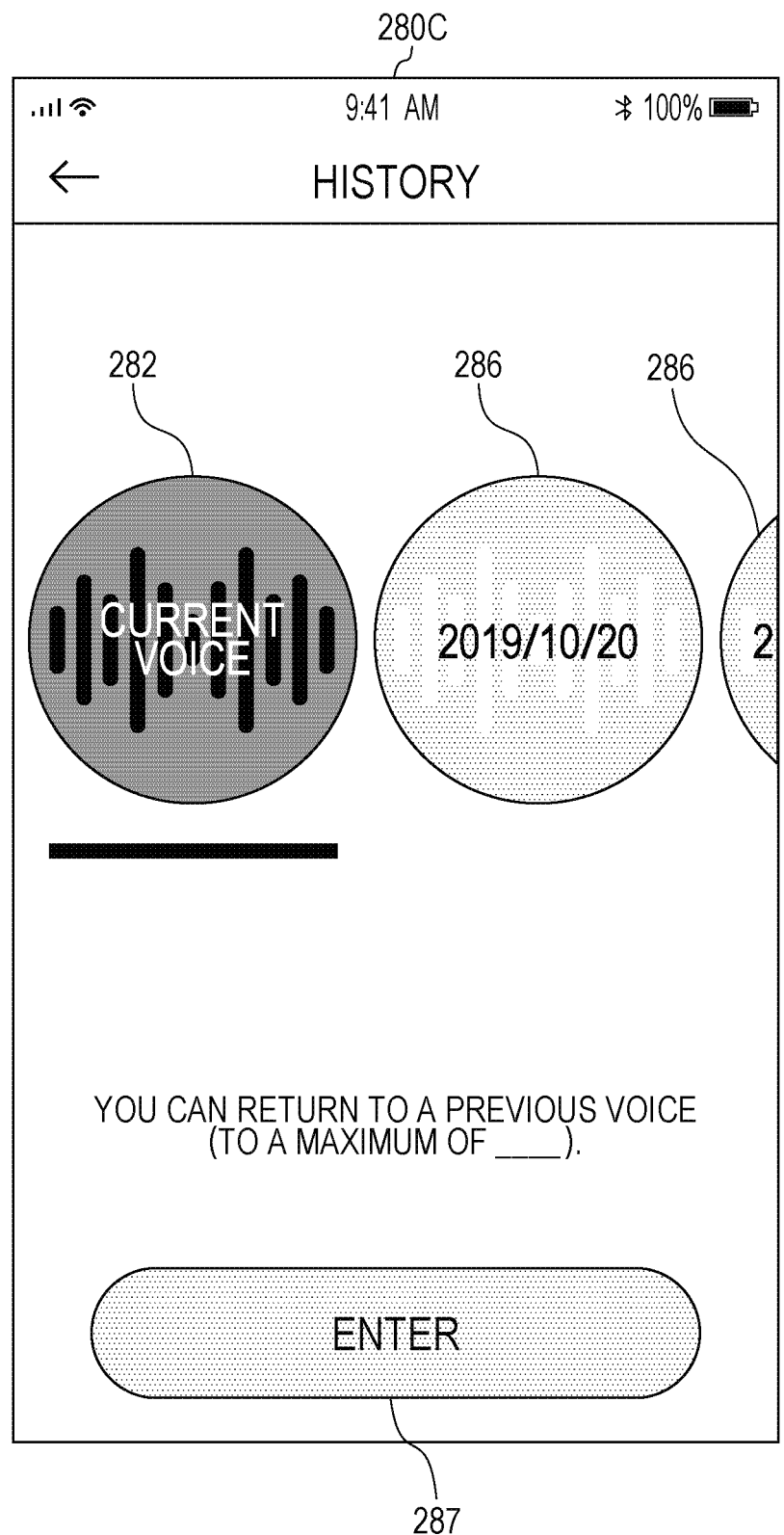
FIG. 12C is a drawing showing an example of an application screen displayed in accordance with an operation of the application screen shown in FIG. 12A.

FIG. 12C is an application screen 280C, which is displayed when a history button 285 of the application screen 280A is pressed. Speech selection buttons 286 for selecting a multiple of individuality parameters previously set by a user are displayed together on the application screen 280C. That is, a history of individuality parameters previously set by the user is stored in an information terminal in which a control application is installed. As an example, a maximum number of previous individuality parameters that can be selected is fixed in advance. This kind of individuality parameter history may also be saved in the cloud.

A date on which the individuality parameter has been set for the robot 100 is written on the speech selection button 286. Because of this, a user can recognize differences in items of speech corresponding to the speech selection buttons 286. Also, by a user carrying out a scrolling operation on a screen of the information terminal, the speech selection button 286 corresponding to a previously set individuality parameter but not already displayed is displayed. Further, when a user presses a button 287 on which "Enter" is written, the individuality parameter corresponding to the speech selection button 286 selected by the user is set for the robot 100.

Also, it is determined whether or not an individuality parameter selected by a user via the application screen 280C is speech characteristic data that are not currently set for another robot in a robot group in which the robot 100 is included. That is, an individuality parameter that is a stored individuality parameter but is currently set by another robot cannot be set for the robot 100.

Figure 12D:
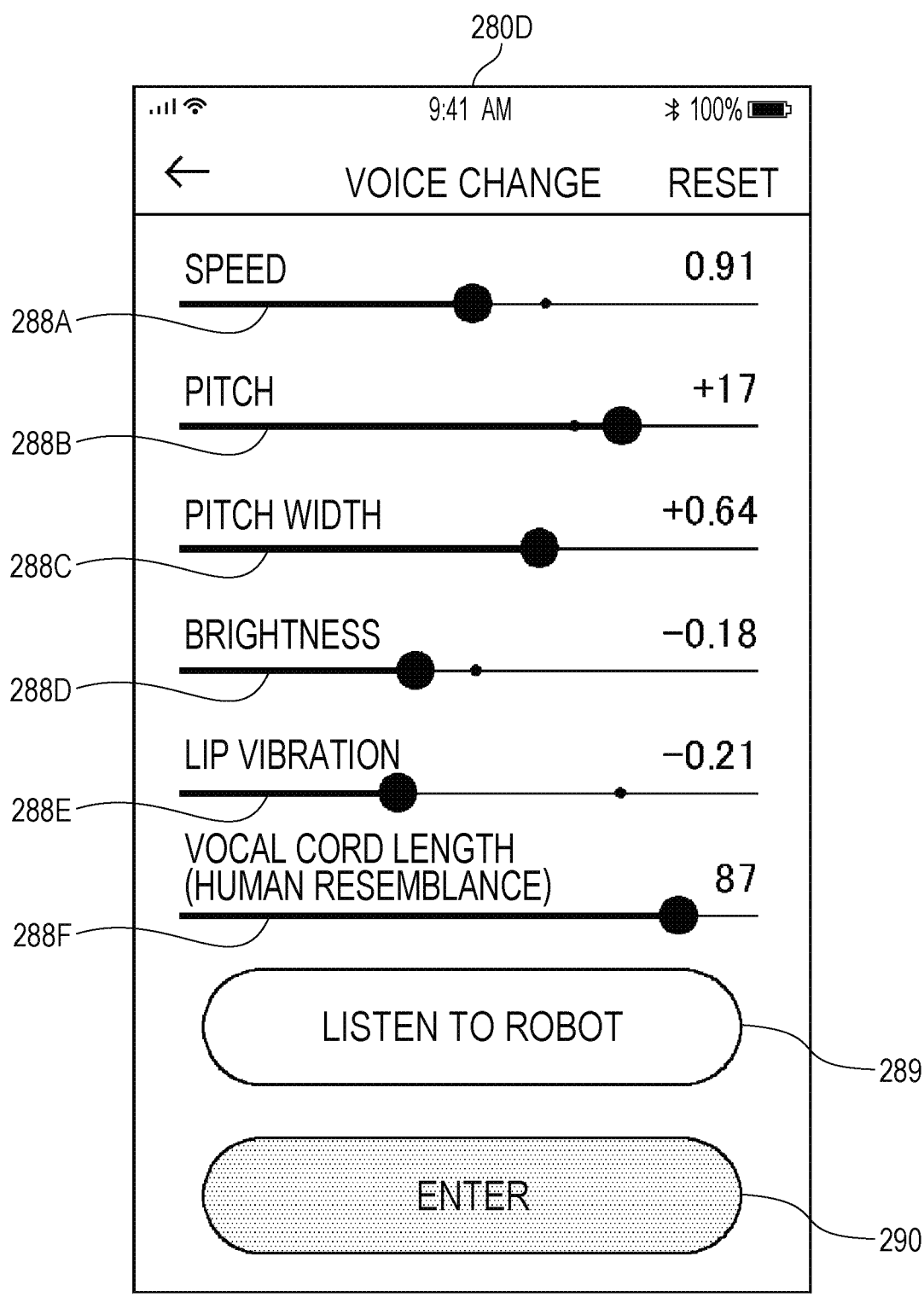
FIG. 12D is a drawing showing an example of an application screen displayed when a user customizes speech to be output from a robot.

FIG. 12D is an application screen 280D that is displayed on an information terminal when a user customizes speech to be output from a robot. Individuality parameters for generating speech (a combination of values of a multiple of parameters) are displayed in such a way as to be selectable by a user on the application screen 280D. As an example, a user selects a value of a parameter by moving slider bars 288A to 288F corresponding one each to a parameter to the left or the right. That is, rather than speech to be set for the robot 100 being automatically generated, a user generates speech manually in accordance with his or her preference.

In the example of FIG. 12D, speed, pitch, pitch width, brightness, lip vibration, and vocal cord length are set as parameters selectable by a user. These multiple parameters are treated as one parameter set, and a parameter set of speech that is not currently set for another robot can be set as speech of the robot 100. The parameter set is the same as parameters among individuality parameters generated by a user pressing the button 281 of the application screen 280A.

Speed is a speaking speed per unit of sound. In language, a unit of sound is a syllable. The greater the value, the faster the speaking speed becomes. Pitch is an average pitch height. The greater the value, the higher the pitch becomes. Pitch width is a width of pitch over which sound can be enunciated. The greater the value, the greater the width of pitch becomes. Brightness is a parameter indicating brightness of a voice (sound). The brightness of a sound is changed by changing one portion (for example, an overtone component) of frequency components of an enunciated sound. The greater the value, the more easily an impression that a voice (sound) is bright is conveyed. Lip vibration is an extent of lip vibration in an enunciation structure that resembles a human vocalization structure (mouth). The greater the value, the greater a sound reflection rate in the human vocalization structure. Interval length is a parameter indicating a vocal cord length in an enunciation structure that resembles a human vocalization structure (mouth). The greater the value, the further low frequency components of a sound increase, and the voice becomes adult-like.

Also, when a user presses a button 289 on which "Listen to robot" is written, speech generated by selected individuality parameters (a parameter set) is output from the speaker 112 included in the robot 100. Further, when an operation of depressing the enter button 290 is detected, the selected parameter set is set for the relevant robot 100. An individuality parameter generated manually is also assumed to be speech that does not duplicate an individuality parameter currently set for another robot 100. Specifically, an information terminal transmits individuality parameters (a parameter set) selected by a user to a server that manages a speech setting, and the server determines whether or not the individuality parameters duplicate individuality parameters set for another robot 100, and transmits a determination result to the information terminal. Further, in a state wherein individuality parameters (a parameter set) that duplicate those of another robot 100 have been selected, the information terminal deactivates the enter button 290, in addition to which a display to the effect that the individuality parameters are being used in another robot is output to a touch panel display 210. In this case, the server or the information terminal generates individuality parameters that are similar to the individuality parameters selected by the user, and a button for causing the generated individuality parameters to be reproduced may be displayed on the touch panel display.

Also, a configuration may be such that speech customization using the application screen 280D can be carried out by a user who satisfies a predetermined condition. A predetermined condition is, for example, a user whose period of use of the robot 100 exceeds a predetermined period set in advance, a user who gains a predetermined number of points, or a user who is charged a predetermined amount of money.

At least one embodiment is such that individual speech is output from a robot, because of which the embodiment has an advantage in that a user can easily feel that the robot is a living being, and is useful as a robot that outputs speech.

What is claimed is:

1. A robot, comprising:
   a non-transitory computer readable medium configured to store instructions;
   a processor connected to the non-transitory computer readable medium, wherein the processor is configured to execute the instructions for generating speech based on an individuality parameter and a sensing parameter, wherein the individuality parameter is predetermined for the robot;
   a speaker configured to output the generated speech; and
   a sensor configured to detect a physical quantity and output sensor information, wherein the sensing parameter is determined based on the sensor information,
   wherein the processor is configured to
   generate the speech in response to the sensor information being predetermined sensor information being received continuously for a predetermined time.

2. The robot according to claim 1, wherein the processor is configured to generate the speech in response to a determination that the sensor continuously received an acceleration above a threshold value for a duration equal to or longer than the predetermined time.

3. The robot according to claim 1, further comprising a plurality of sensors, wherein the sensor is one of the plurality of sensors, and each of the plurality of sensors is configured to detect the physical quantity and output the sensor information, wherein
the processor is configured to generate the speech based on the sensor information from the plurality of sensors.

4. The robot according to claim 1, further comprising:
a plurality of sensors, wherein the sensor is one of the plurality of sensors, and each of the plurality of sensors is configured to detect the physical quantity and output the sensor information, wherein
the processor is configured to determine a semantic situation based on the sensor information, and to generate the speech based on the determined semantic situation.

5. The robot according to claim 1, wherein the processor is configured to generate the speech in response to a determination that the robot is being hugged.

6. The robot according to claim 1, wherein the processor is configured to determine at least one of a volume or an interval based on the sensor information, and to generate the speech having a same property as at least one of the determined volume or interval.

7. The robot according to claim 1, wherein the processor is configured to:
fix a standard speech independent from the individuality parameter set; and
generate the speech by adjusting the fixed standard speech based on the individuality parameter set and the sensing parameter.

8. The robot according to claim 1, wherein the processor is configured to update the individuality parameter in response to the sensor information.

9. The robot according to claim 1, wherein the processor is configured to
set the individuality parameter based on the instruction received.

10. The robot according to claim 1, further comprising a microphone configured to convert a sound into an electrical signal, wherein the processor is configured to set the individuality parameter set based on the electrical signal.

11. The robot according to claim 1, further comprising a positioning device configured to measure a position, wherein the processor is configured to set the individuality parameter based on the measured position.

12. The robot according to claim 1, wherein the processor is configured to:
generate the speech corresponding to a value output by an internal sensor, and perform a semantic interpretation of the value, and
generate the speech in accordance with the semantic interpretation.

13. A robot, comprising:
a non-transitory computer readable medium configured to store instructions;
a processor connected to the non-transitory computer readable medium, wherein the processor is configured to execute the instructions for:
generating speech;
recognizing speech conditions, wherein the speech conditions include a speech output start time and at least one speech parameter, wherein generating the speech comprises generating the speech based on the at least on speech condition; and
a speaker configured to output the generated speech at the speech output start time, wherein the processor is configured to recognize a first speech condition,
wherein the at least one speech parameter includes a parameter indicating pitch,
a first pitch included in the first speech condition is determined based on a predetermined relationship with a second pitch of a second speech condition,
a first output start timing included in the first speech condition is equal to a second output start timing included in the second speech condition, and
an interval, that is a relative relationship between the first pitch included in the first speech condition and the second pitch included in the second speech condition, is a consonant interval.

14. The robot according to claim 13, wherein the processor is configured to generate the speech based on the at least one speech parameter and based on an individuality parameter of the robot.

15. The robot according to claim 13, wherein at least one the speech condition includes a condition indicating a speech content length, and
the processor is configured to randomly fix speech content that coincides with the speech content length.

16. The robot according to claim 13, wherein the at least one speech condition includes a condition indicating a speech content length, and
the processor is configured to fix speech content that coincides with the speech content length based on previously detected speech.

17. A robot, comprising:
a non-transitory computer readable medium configured to store instructions;
a processor connected to the non-transitory computer readable medium, wherein the processor is configured to execute the instructions for generating speech;
a speaker configured to output the generated speech;
an acceleration sensor configured to detect acceleration of the robot and output information indicative of the acceleration of the robot, wherein the processor is configured to determine a stress pattern of speech based on the detected acceleration, and to generate the speech based on the determined stress pattern,
wherein determination of the stress pattern of speech comprises determining an emphasis for at least one syllable of the speech based on the detected acceleration.

18. The robot according to claim 17, wherein the processor is configured to:
recognize a first speech condition based on the generated speech, and the first speech condition is a same condition as a second speech condition from an external source, and
generate the speech based on at least one speech parameter includes a parameter indicating pitch.

19. The robot according to claim 18, wherein a first pitch included in the first speech condition is determined based on a predetermined relationship with a second pitch of the detected second speech condition.

20. The robot according to claim 19, wherein
a first output start timing included in the first speech condition is equal to a second output start timing included in the detected second speech condition, and
an interval, that is a relative relationship between the first pitch included in the first speech condition and the second pitch included in the detected second speech condition, is a consonant interval.

21. A robot, comprising:
a non-transitory computer readable medium configured to store instructions;
a processor connected to the non-transitory computer readable medium, wherein the processor is configured to execute the instructions for:
generating speech;
recognizing speech conditions, wherein each of the speech conditions includes a speech output start time and at least one speech parameter, wherein generating the speech comprises generating the speech based on at least one of the speech conditions; and
a speaker configured to output the generated speech at the speech output start time,
wherein the processor is configured to recognize a first speech condition of the speech conditions, and the first speech condition is partly a same condition as a second speech condition of the speech conditions that is used to generate second speech that is output by a second robot.

* * * * *